US009593003B2

(12) United States Patent
Goncalves et al.

(10) Patent No.: US 9,593,003 B2
(45) Date of Patent: Mar. 14, 2017

(54) CASTER WHEEL WITH CONSTANT FORCE MECHANISM

(71) Applicants: Fernando D. Goncalves, Binghamton, NY (US); Paul F. Finnegan, Windsor, NY (US); Greg Sigman, Sherburne, NY (US); Michael V. Brown, Endicott, NY (US); William Doak, Apalachin, NY (US)

(72) Inventors: Fernando D. Goncalves, Binghamton, NY (US); Paul F. Finnegan, Windsor, NY (US); Greg Sigman, Sherburne, NY (US); Michael V. Brown, Endicott, NY (US); William Doak, Apalachin, NY (US)

(73) Assignee: The Raymond Corporation, Greene, NY (US)

( * ) Notice: Subject to any disclaimer, the term of this patent is extended or adjusted under 35 U.S.C. 154(b) by 320 days.

(21) Appl. No.: 14/267,267

(22) Filed: May 1, 2014

(65) Prior Publication Data

US 2015/0274496 A1 Oct. 1, 2015

Related U.S. Application Data

(63) Continuation-in-part of application No. 14/242,491, filed on Apr. 1, 2014.

(51) Int. Cl.
*B66F 9/065* (2006.01)
*B66F 9/075* (2006.01)
(Continued)

(52) U.S. Cl.
CPC ........ *B66F 9/07586* (2013.01); *B60B 33/045* (2013.01); *B60G 3/20* (2013.01);
(Continued)

(58) Field of Classification Search
CPC .... B66F 9/07586; B66F 9/065; B60B 33/045; B60G 3/02; B60G 3/20; B60G 11/50; B60G 21/055; B62B 2301/23
See application file for complete search history.

(56) References Cited

U.S. PATENT DOCUMENTS

| 1,906,238 A | | 5/1933 | Ramsey et al. |
| 2,709,829 A | * | 6/1955 | Marvin ................... B60B 33/02 |
| | | | 16/35 D |

(Continued)

FOREIGN PATENT DOCUMENTS

| EP | 0556543 A2 * | 8/1993 | ............. B60B 33/04 |
| EP | 1022166 A2 | 7/2000 | |

(Continued)

OTHER PUBLICATIONS

European Search Report; Appln. No. EP15161975; 8 pages; dated Aug. 10, 2015.

*Primary Examiner* — Laura Freedman
(74) *Attorney, Agent, or Firm* — Quarles & Brady LLP

(57) ABSTRACT

A wheel assembly for a material handling vehicle includes a chassis, a first caster wheel mounted to the chassis, a second caster wheel mounted to the chassis, a torsion bar coupling the first caster wheel to the second caster wheel, and a constant force mechanism coupled to at least one of the first caster wheel, the second caster wheel and the torsion bar. The first and second caster wheels are displaceable in at least one dimension, and the constant force mechanism imparts a substantially constant force opposing a displacement in the at least one dimension.

20 Claims, 22 Drawing Sheets

(51) Int. Cl.
*B60B 33/04* (2006.01)
*B60G 3/20* (2006.01)
*B62B 5/00* (2006.01)
*B62B 3/06* (2006.01)

(52) U.S. Cl.
CPC .............. *B62B 3/0612* (2013.01); *B62B 5/00* (2013.01); *B66F 9/065* (2013.01); *B62B 2301/23* (2013.01)

(56) References Cited

U.S. PATENT DOCUMENTS

| | | | | |
|---|---|---|---|---|
| 2,891,764 | A * | 6/1959 | Pearne | B64F 5/0036 16/44 |
| 4,000,912 | A * | 1/1977 | Donald | B60G 11/14 267/71 |
| 4,246,567 | A * | 1/1981 | Miller | B60C 23/20 200/61.23 |
| 4,449,725 | A * | 5/1984 | Robison | B60B 33/045 280/78 |
| 4,534,433 | A * | 8/1985 | Burbank | B60B 33/045 16/18 B |
| 4,598,784 | A * | 7/1986 | Tronich | B60G 17/02 180/19.2 |
| 4,637,093 | A * | 1/1987 | Kassai | B60B 33/0078 16/35 R |
| 5,072,960 | A * | 12/1991 | Sperko | B62B 3/04 16/35 D |
| 5,590,735 | A * | 1/1997 | Cartier | B60B 33/045 16/19 |
| 5,628,377 | A * | 5/1997 | Le Gloan | B60B 33/04 16/18 B |
| 5,649,454 | A | 7/1997 | Midha et al. | |
| 5,685,555 | A | 11/1997 | McCormick et al. | |
| 6,357,077 | B1 * | 3/2002 | Jones, Jr. | B60B 33/045 16/35 D |
| 6,484,359 | B1 * | 11/2002 | Guttmann | B60B 33/045 16/18 R |
| 6,543,798 | B2 * | 4/2003 | Schaffner | A61G 5/06 16/44 |
| 6,550,101 | B2 * | 4/2003 | Plate | B60B 33/04 16/19 |
| 6,604,414 | B1 * | 8/2003 | Claussen | B60C 23/003 73/146 |
| 6,759,952 | B2 | 7/2004 | Dunbridge et al. | |
| 6,940,415 | B2 | 9/2005 | Nagata et al. | |
| 7,093,319 | B2 * | 8/2006 | Lemeur, Jr. | B60B 33/045 16/105 |
| 7,267,349 | B2 * | 9/2007 | Sica | B60G 3/185 187/222 |
| 7,497,449 | B2 * | 3/2009 | Logger | B60B 33/045 16/19 |
| 7,762,129 | B2 | 7/2010 | Niklas et al. | |
| 7,770,904 | B2 | 8/2010 | Passeri | |
| 7,782,183 | B2 | 8/2010 | Wieser | |
| 7,874,223 | B2 | 1/2011 | Sugar et al. | |
| 7,918,514 | B2 | 4/2011 | Dal Pra' | |
| 8,731,785 | B2 * | 5/2014 | McCabe | B60G 17/016 187/222 |
| 8,763,990 | B2 * | 7/2014 | Day | B62B 3/001 254/2 B |
| 9,085,203 | B2 * | 7/2015 | Duppong | B60C 23/067 |
| 9,168,784 | B2 * | 10/2015 | DeChristopher | B60B 33/0068 |
| 2005/0156391 | A1 * | 7/2005 | Krenzin | B66F 9/07586 280/5.515 |
| 2006/0090885 | A1 | 5/2006 | Raslas | |
| 2011/0126617 | A1 | 6/2011 | Bengoechea Apezteguia et al. | |
| 2012/0049610 | A1 | 3/2012 | Lew | |
| 2013/0278406 | A1 * | 10/2013 | Weston | B60C 23/0488 340/442 |
| 2015/0274495 | A1 * | 10/2015 | Goncalves | B66F 9/07586 254/2 R |

FOREIGN PATENT DOCUMENTS

| | | | | |
|---|---|---|---|---|
| EP | | 1588979 A2 * | 10/2005 | ........... B60G 17/005 |
| EP | | 1 147 968 B1 | 10/2006 | |
| JP | | 11180104 A | 7/1999 | |
| JP | | 2000142012 A | 5/2000 | |
| JP | | 2003079671 A * | 3/2003 | |
| JP | | 2005350154 A * | 12/2005 | |

* cited by examiner

CASTER WHEEL WITH CONSTANT FORCE MECHANISM

CROSS REFERENCES TO RELATED APPLICATIONS

This application is a continuation-in-part of pending U.S. application Ser. No. 14/242,491, filed on Apr. 1, 2014, which is herein incorporated by reference in its entirety.

STATEMENT REGARDING FEDERALLY SPONSORED RESEARCH

Not Applicable.

BACKGROUND OF THE INVENTION

The present invention relates to a wheel assembly for a vehicle, and more particularly to a wheel assembly for a material handling vehicle such as a pallet truck.

Vehicles, such as material handling vehicles (e.g., pallet trucks, reach trucks, counterbalance trucks, tow tractors, order pickers, etc.), utility carts, wagons, etc. incorporate wheels in a variety of roles, such as a drive wheel, a steering wheel, a support wheel, or some combination thereof. In some configurations, the wheel assembly includes a caster wheel. All of the wheels will wear over time and will eventually require maintenance to repair or replace the wheel.

In the material handling industry, increased load carried by the wheels, smaller wheel diameters, and higher rotational velocities of the wheels tend to exacerbate the wear, further impacting the useful life of a wheel.

A material handling vehicle, and in particular, a pallet truck is often equipped with a main drive wheel and one or more additional wheels. These additional wheels, which may be casters, are included, for example, to enhance handling and maneuverability. Although casters behave well when properly maintained, it can be possible for the caster to fall out of adjustment as the drive wheel wears. Adjusting casters can be a time consuming process.

Traditional casters require periodic adjustment to compensate for drive wheel wear. This adjustment is normally done by adding or removing shims between the caster and the vehicle to raise or lower the caster. The adjustment process can be labor intensive. In certain cases, to adjust the caster, the vehicle must be elevated and the caster must be removed before shims can be added or removed.

More advanced casters have adjustment screws that can raise or lower the caster to facilitate periodic adjustments. The adjustment screws can be accessed from the side on some designs and from the top on others. In this case, the casters can be adjusted without removing the caster but the adjustment point is under the vehicle. Top adjust casters provide an easier access point but require a hole in the operator floor.

Fundamentally, a disadvantage of current caster systems for material handling vehicles is the necessity for periodic adjustment. Therefore, a need exists for an improved wheel assembly for a vehicle that reduces the frequency of periodic adjustments of the caster wheels. Furthermore, a need exists for a means for providing a definitive indication to assist maintenance technicians in determining when drive wheel or caster wheel repair or replacement is required.

In another aspect, a material handling vehicle may include one or more spring-loaded or sprung caster wheels. For example, sprung caster wheels may be installed on end rider or center rider pallet truck including one or more lifting forks to provide a more stable platform for the vehicle. Whereas a drive tire or a load wheel may bear the majority of a load carried by a material handling vehicle, a sprung caster wheel may provide a restoring force during turning or cornering maneuvers. The restoring force provided by the sprung casters may be useful to minimize vehicle roll or to improve the stability of a load carried by the forks.

Generally, sprung caster wheels for material handling vehicles may be adjusted to provide a set preload force, such as about 1.1 kilonewtons (kN) or about 250 lb-force ($lb_f$). However, as one or more of the drive wheel, load wheel or caster wheels wear during operation of the material handling vehicle, the force may build linearly (or non-linearly) as the deflection across the caster wheel increases. In the example case of a pallet truck with a drive wheel and a pair of flanking sprung caster wheels, as the tire of the drive wheel wears, the deflection across the casters wheels may increase. This may cause the caster wheels to bear a greater load which in turn may require the force on the caster wheels to be adjusted, for example, to maintain one or more performance characteristics of the material handling vehicle. As described above, adjusting caster wheels may be a time consuming process depending on the location of the caster wheels and the method by which the caster wheel are accessed or adjusted.

In a related aspect, for a material handling vehicle with two or more sprung caster wheels, it may be useful to provide a torsion bar as described in U.S. Pat. No. 7,770,904 (hereinafter, the '904 patent). The '904 patent describes that a material handling vehicle may include a pair of swivel casters mounted with respective conventional springs and coupled by a torsion bar. However, for at least the reasons described above, the use of caster wheels with conventional springs to provide a restoring force may have several drawbacks. Accordingly, a need exists to provide a system that may provide roll resistance, for example, to stabilize the vehicle, while also reducing the frequency with which maintenance must occur to adjust caster wheels.

SUMMARY

The present disclosure provides a caster wheel assembly that may require less frequent adjustment in the field in response to drive wheel wear. In one embodiment, the caster wheel assembly may generate a constant downward force as the drive wheel wears. The caster wheel assembly may be tuned to provide an appropriate nominal downward force. This downward force may be tunable based on desired vehicle performance characteristics. As the drive wheel wears, the deflection across the caster may increase while the caster force remains fixed at the nominal level. In some embodiments, the desired force profile may be achieved with a caster wheel assembly including a constant force mechanism. The constant force mechanism may enable the caster wheel to apply a constant downward force on a ground contact surface throughout the operation of the material handling vehicle. In some embodiments, a variable constant force mechanism may include a secondary spring element that may provide additional resistance once the deflection of the caster wheel exceeds a threshold value.

The present disclosure generally provides a wheel assembly including a constant force mechanism and a wheel coupled to the constant force mechanism. The wheel is displaceable in at least one dimension, and the constant force mechanism imparts a substantially constant force on the wheel in the at least one dimension. In some embodiments, for a wheel displacement greater than a predetermined wheel displacement, a variable constant force mechanism can impart a variable force on the wheel, and wherein the variable force is equal to or greater than the substantially constant force. In another aspect, the wheel is displaceable in a first regime and a second regime. For a wheel displacement in the first regime, the constant force mechanism imparts a substantially constant force on the wheel, and for a wheel displacement in the second regime, a variable constant force mechanism imparts a variable force on the wheel. The variable force can be linear or non-linear to the magnitude of the displacement in the second regime and can be equal to or greater than the substantially constant force.

In one aspect, the wheel assembly further includes a sensor coupled to the wheel in order to measure a property of the wheel. The sensor is coupled to a sensor system that can generate a signal when a measured deflection of the wheel exceeds a predetermined threshold. In another aspect, the signal communicates a status of the wheel. In still another aspect, the sensor system can determine an average deflection across the wheel.

In another aspect, the constant force mechanism includes a first support structure and a second support structure. The first support structure is arranged at a substantially right angle to the second support structure. A first carriage is movable along a length of the first support structure, and a second carriage is movable along a length of the second support structure. A rigid arm is pivotally connected to the first and second carriages. A first resistance device opposes movement of the first carriage along the length of the first support structure, a second resistance device opposes movement of the second carriage along the length of the second support structure, and in some embodiments a third resistance device can be included to further oppose movement of one of the first and second carriages. In a first regime, the constant force mechanism imparts the substantially constant force on the wheel for a translational displacement less than a distance X along one of the length of the first support structure and the length of the second support structure, and in a second regime, the variable constant force mechanism imparts the variable force on the wheel for a translational displacement equal to or greater than a distance X along one of the length of the first support structure and the length of the second support structure.

In another embodiment, a method of indicating a maintenance requirement includes the steps of: (i) providing a sensor configured to measure a status of a wheel assembly on a material handling vehicle; (ii) measuring the status of the wheel assembly; and (iii) communicating a signal that provides an indication for maintenance of the wheel assembly.

In another embodiment, a wheel assembly includes a constant force mechanism and a wheel coupled to the constant force mechanism, the constant force mechanism exerting a force on the wheel resisting displacement of the wheel. A sensor measures deflection of the wheel.

In one aspect, for a wheel deflection in a first regime, the constant force mechanism imparts a substantially constant force on the wheel, and for a wheel displacement in a second regime, a variable constant force mechanism imparts a variable force on the wheel, wherein the variable force is proportional to the magnitude of the deflection in the second regime, and wherein the variable force is equal to or greater than the substantially constant force.

In another embodiment, a material handling vehicle comprises a vehicle chassis; a fork carriage coupled to the vehicle chassis; at least one lifting fork coupled to the fork carriage and displaceable in at least one dimension; a drive wheel coupled to the vehicle chassis; at least one caster wheel assembly coupled to the vehicle chassis, the at least one caster wheel assembly including a constant force mechanism and a caster wheel, the caster wheel coupled to the constant force mechanism; and the constant force mechanism exerts a force on the caster wheel resisting displacement of the caster wheel.

In yet another embodiment, a wheel assembly for a material handling vehicle includes a chassis, a first caster wheel mounted to the chassis, a second caster wheel mounted to the chassis, a torsion bar coupling the first caster wheel to the second caster wheel, and a constant force mechanism coupled to at least one of the first caster wheel, the second caster wheel and the torsion bar. The first and second caster wheels are displaceable in at least one dimension, and the constant force mechanism imparts a substantially constant force opposing a displacement in the at least one dimension.

In still another embodiment, a wheel assembly for a material handling vehicle includes a chassis and a first caster wheel mounted to the chassis, the first caster wheel including a first constant force mechanism. The wheel assembly further includes a second caster wheel mounted to the chassis, the second caster wheel including a second constant force mechanism, and a torsion bar coupling the first caster wheel to the second caster wheel. In one aspect, the first and second caster wheels are displaceable in at least one dimension. In another aspect, the first constant force mechanism imparts a substantially constant force on the first wheel in the at least one dimension. In a further aspect, the second constant force mechanism imparts a substantially constant force on the second wheel in the at least one dimension.

In a further embodiment, a material handling vehicle includes a vehicle chassis, a fork carriage coupled to the vehicle chassis, and at least one lifting fork coupled to the fork carriage and displaceable in at least a first dimension. The material handling vehicle further includes a first caster wheel mounted to the chassis, a second caster wheel mounted to the chassis, and a drive wheel coupled to the vehicle chassis and positioned intermediate the first and second caster wheels. The material handling vehicle further includes a torsion bar coupling the first caster wheel to the second caster wheel, and a constant force mechanism coupled to at least one of the first caster wheel, the second caster wheel and the torsion bar. In one aspect, the first and second caster wheels are displaceable in at least a second dimension. In another aspect, the constant force mechanism imparts a substantially constant force opposing a displacement in the at least one dimension. In a further aspect, the torsion bar transfers a torque between the first caster wheel and the second caster wheel for a displacement of at least one of the first and second constant force mechanisms in the at least one dimension.

These and still other aspects will be apparent from the description that follows. In the detailed description, preferred example embodiments will be described with reference to the accompanying drawings. These embodiments do not represent the full scope of the invention; rather the invention may be employed in other embodiments. Reference should therefore be made to the claims herein for interpreting the breadth of the invention.

BRIEF DESCRIPTION OF THE DRAWINGS

Like reference numerals will be used to refer to like parts from figure to figure in the following detailed description.

DETAILED DESCRIPTION

Figure 1:
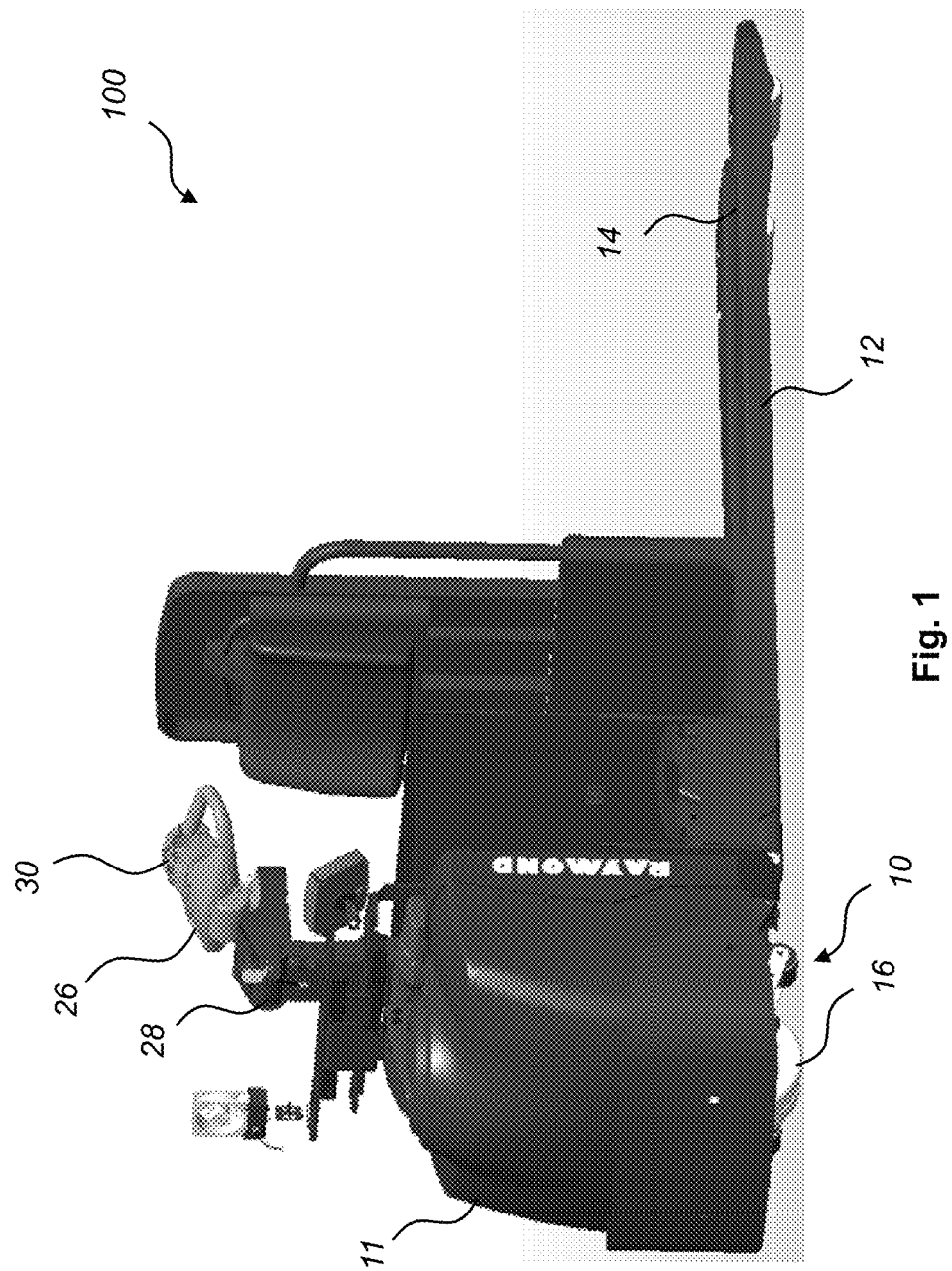
FIG. 1 is a front perspective view of a material handling vehicle equipped with a caster with a constant force mechanism and a position sensor system.
Figure 2:
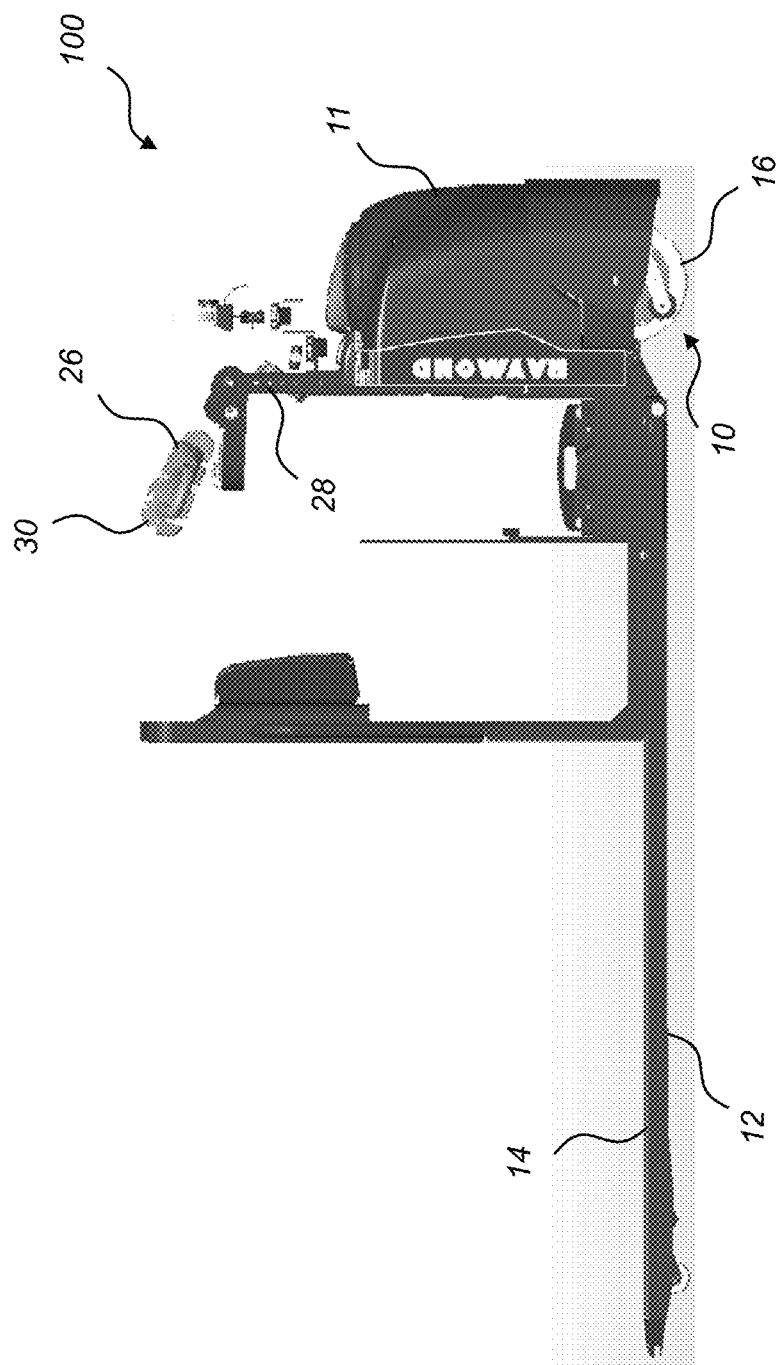
FIG. 2 is a side view of a material handling vehicle equipped with a caster with a constant force mechanism and a position sensor system.
Figure 3:
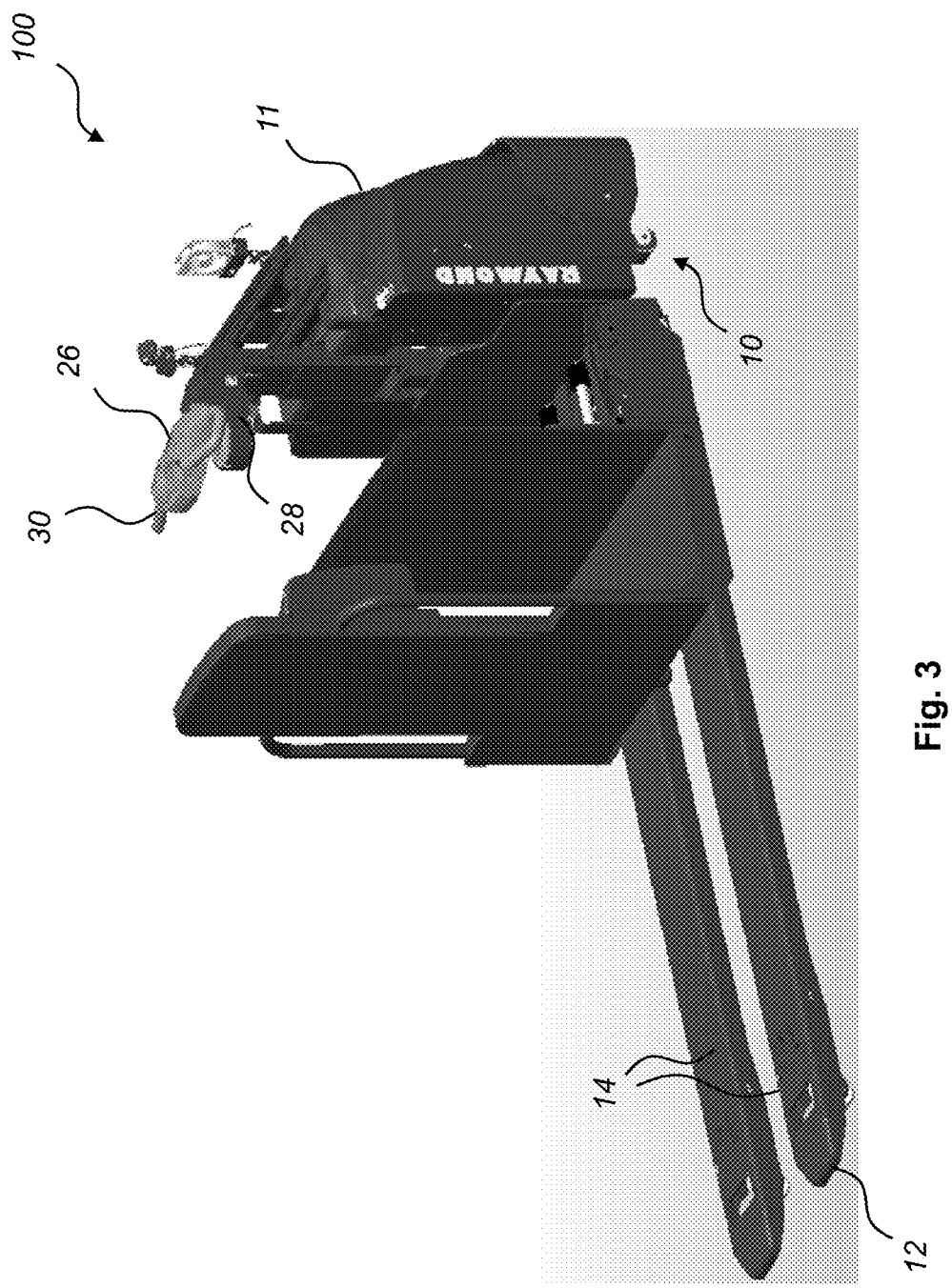
FIG. 3 is a rear perspective view of a material handling vehicle equipped with a caster with a constant force mechanism and a position sensor system.
Figure 4:
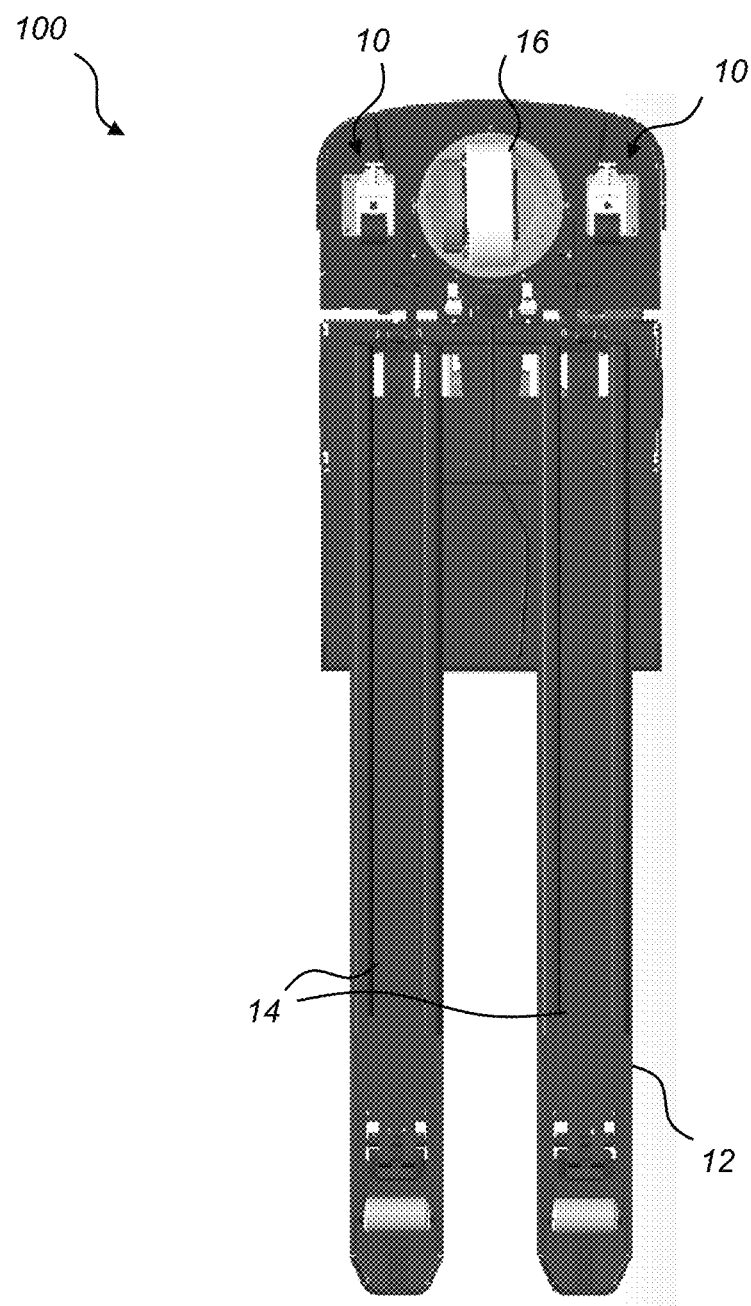
FIG. 4 is a bottom view of a material handling vehicle equipped with a caster with a constant force mechanism and a position sensor system.

Several example embodiments of wheel assemblies, including a caster with a constant force mechanism and a caster with a variable constant force mechanism will be described. As one skilled in the art will appreciate, however, the wheel assembly concept may be implemented in a variety of different configurations and arrangements. Moreover, while the example wheel assembly is generally described with reference to a pallet truck, the wheel assembly concept is equally applicable to other types and styles of powered and unpowered vehicles, such as pallet trucks, tow tractors, sideloaders, counterbalanced trucks, reach trucks, wagons, utility trailers, and the like, as non-limiting examples.

A vehicle in the form of a pallet truck is illustrated in FIGS. 1-4. A motorized hand/rider low-lift pallet truck 100 is comprised of fork carriage 12 having a pair of load bearing forks 14 that are coupled to a power unit 11. The power unit 11 typically includes a housing that houses a hydraulic lift motor pump and traction motor, a drive wheel 16, and a battery housing that houses a battery. Alternatively, the battery can be mounted directly to the pallet truck 100 without a housing. The drive wheel 16 is coupled to a steering mechanism 26 having a tiller arm 28 and an operator control handle 30. The steering mechanism 26 is rotatable to the right and left to control the steering of the pallet truck 100.

The fork carriage 12 has a vertical span of several inches, traveling up and down between ground level and the maximum height. The pallet truck 100 is designed such that the forks 14 are inserted under a load to be moved such as a pallet of goods and the fork carriage 12 lifts the load off of the ground. The pallet truck 100 may be driven to another location where the fork carriage 12 is lowered to place the load on the ground and the forks 14 are withdrawn from the load. One skilled in the art will appreciate the operation and interconnection of the various components of the example pallet truck 100.

Figure 5:
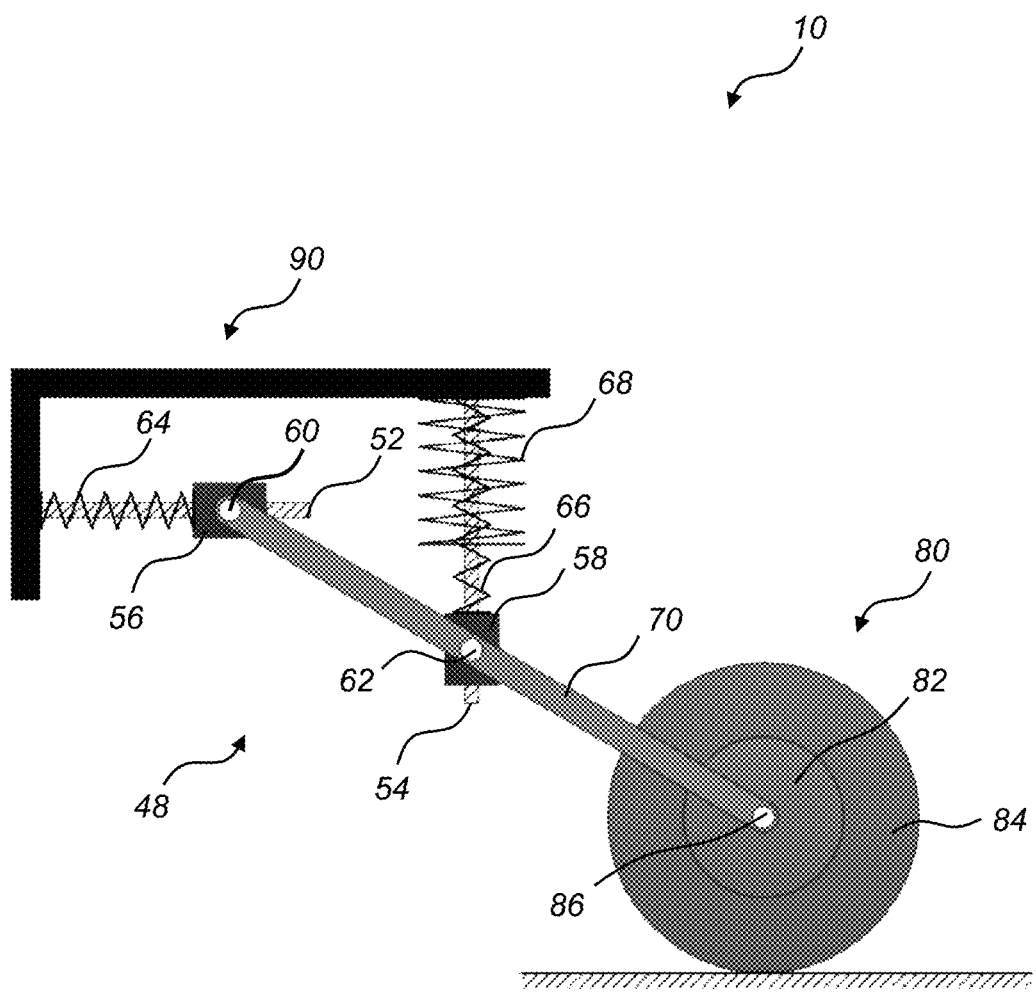
FIG. 5 is a schematic illustration of an embodiment of a caster with a variable constant force mechanism.
Figure 6:
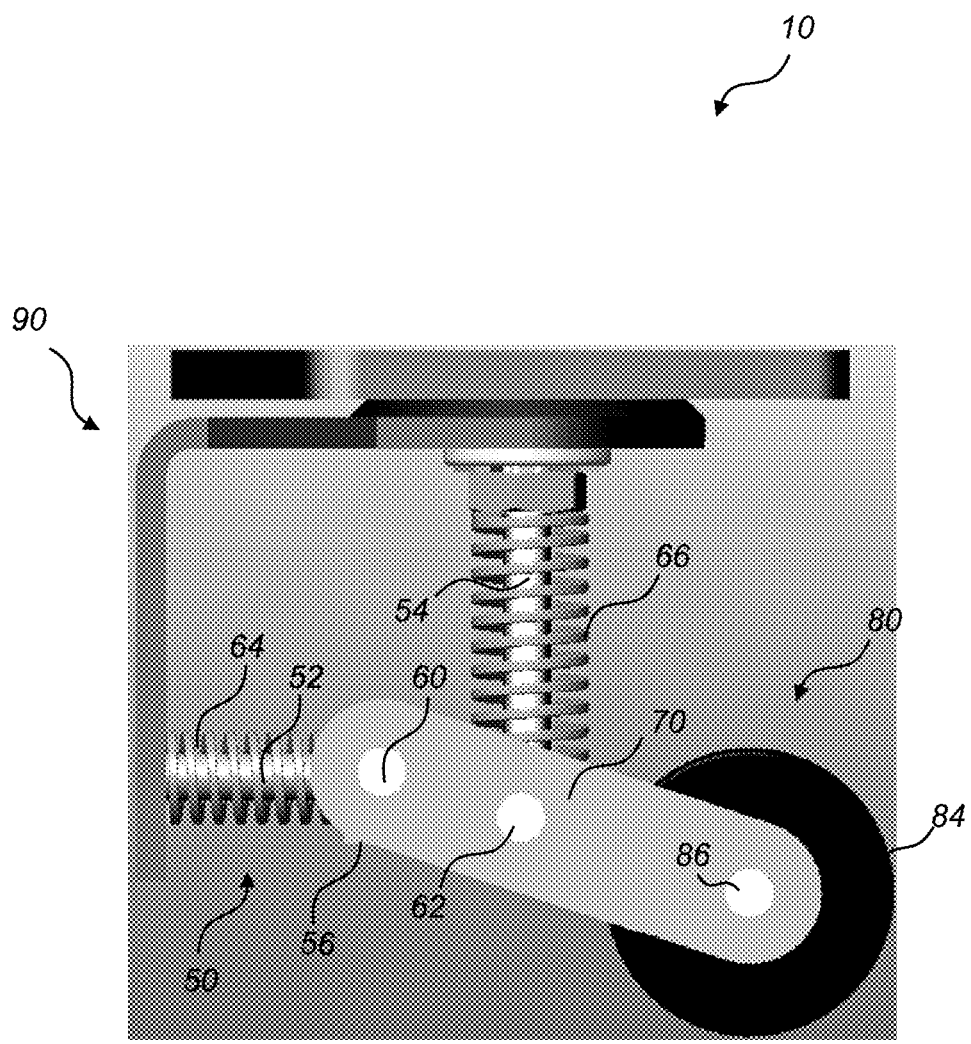
FIG. 6 is a side view of an embodiment of a caster with a constant force mechanism.
Figure 7A:
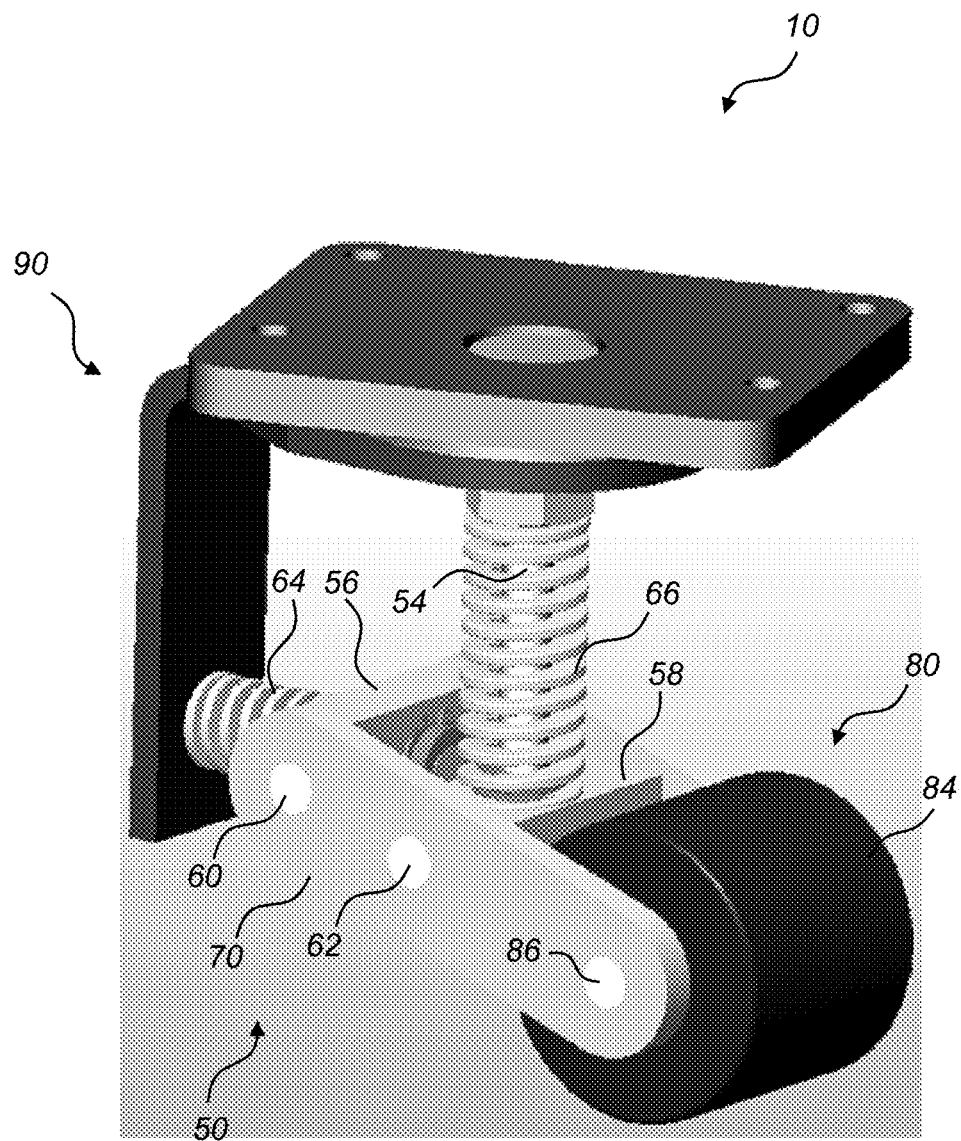
FIG. 7A is a perspective view of a caster with a constant force mechanism as seen in FIG. 6.
Figure 7B:
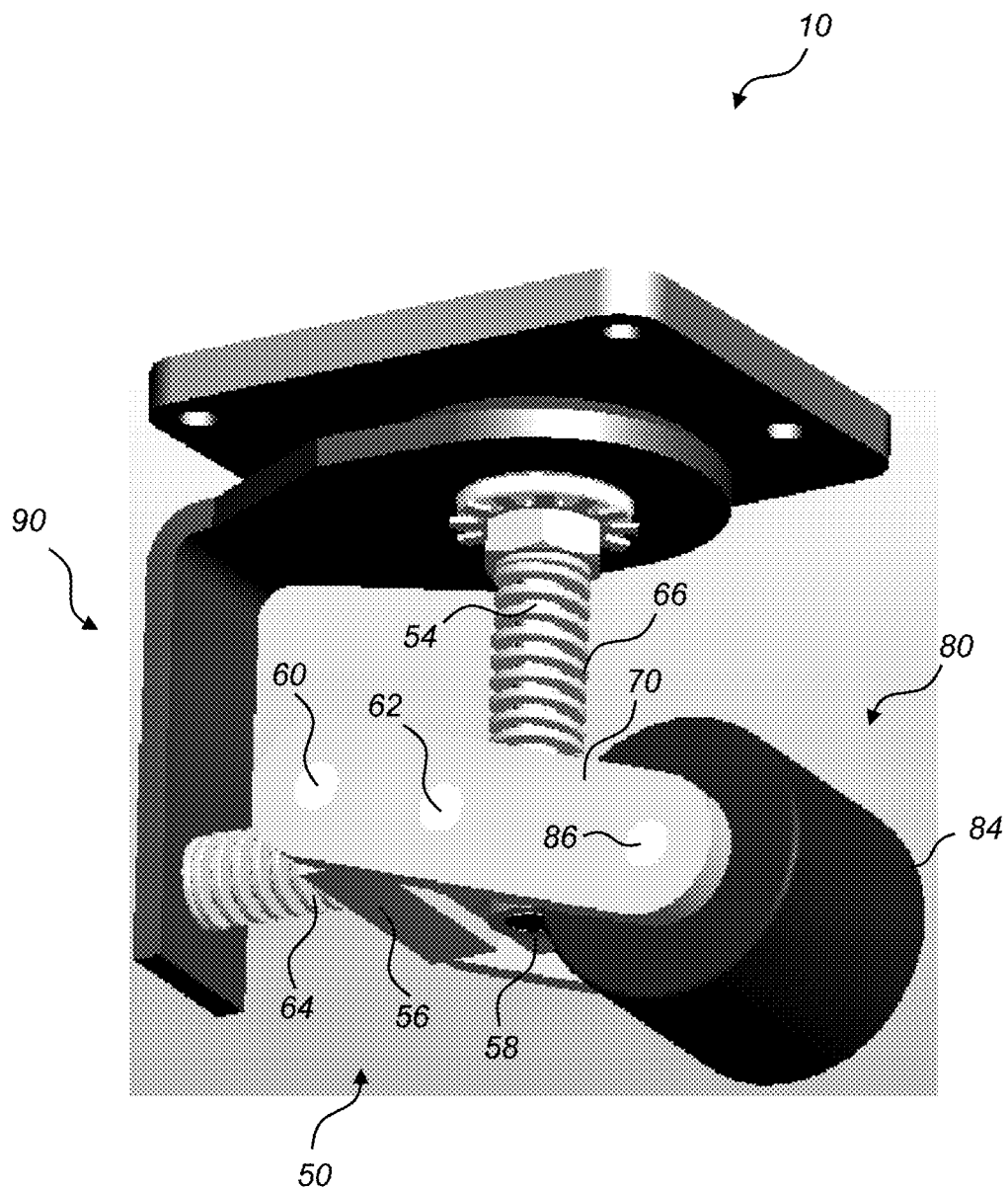
FIG. 7B is an alternate perspective view of the caster with a constant force mechanism of FIG. 6.
Figure 8A:
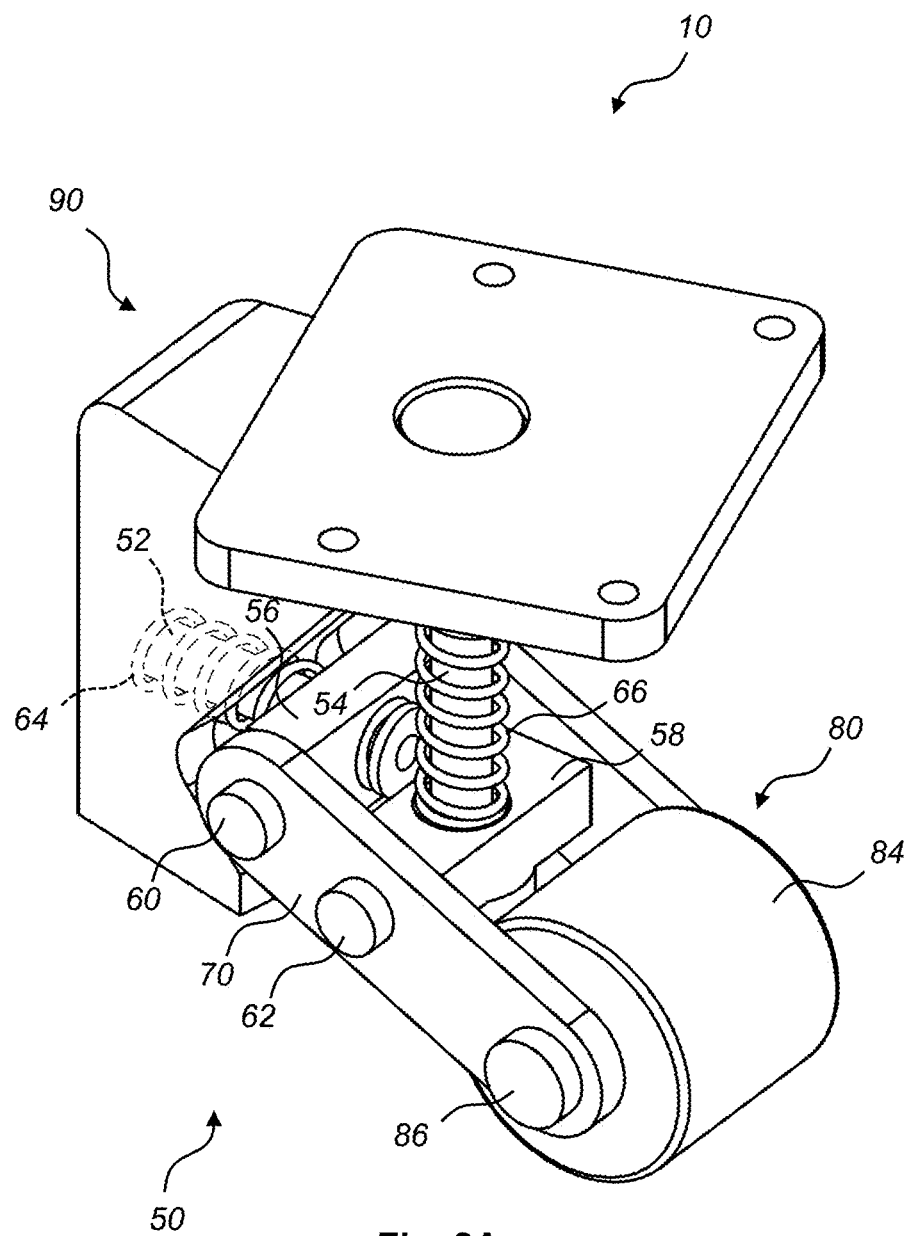
FIG. 8A is a perspective view of an alternative embodiment of a caster with a constant force mechanism.
Figure 8B:
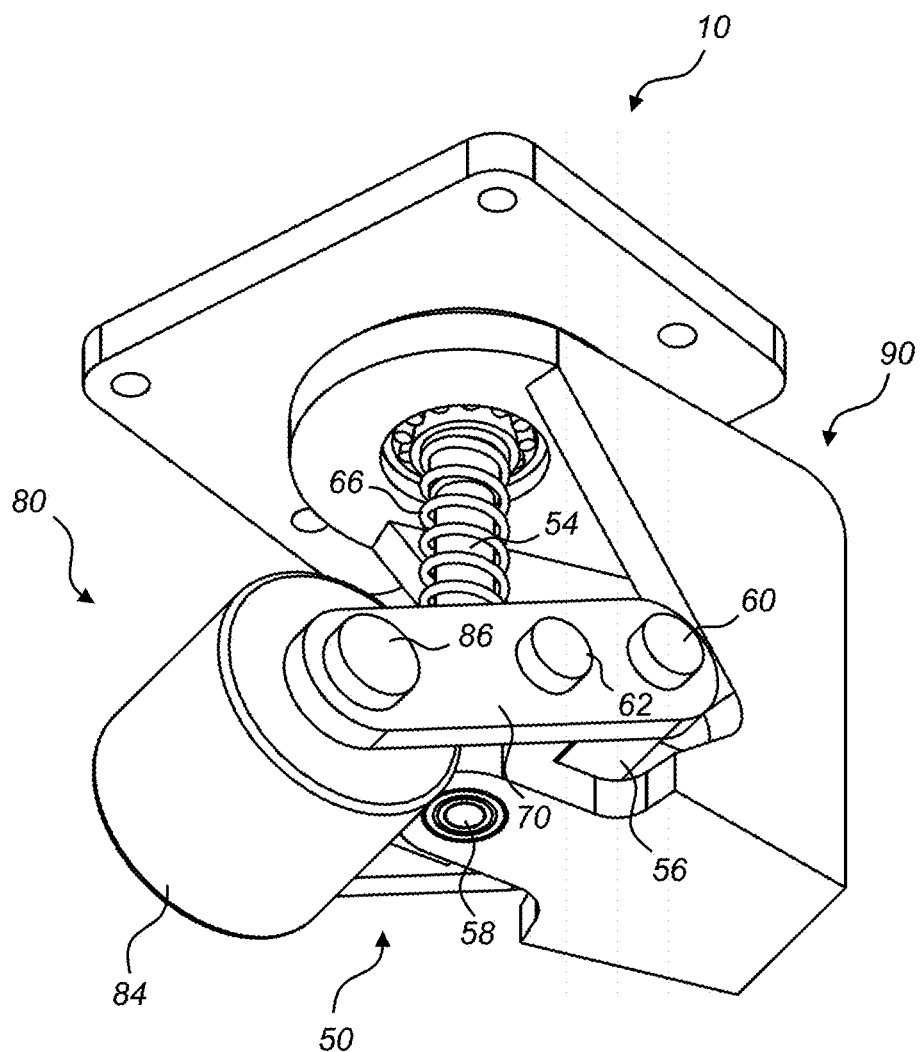
FIG. 8B is an alternate perspective view of the caster with a constant force mechanism of FIG. 8A.

Regarding the example pallet truck 100, one or more wheel assemblies 10 are positioned at the base of the pallet truck 100 and can be positioned near the drive wheel 16. In one embodiment, the wheel assemblies 10 are casters. Referring to FIG. 5, the wheel assembly 10 can include features such as a support 90, a wheel 80, and a variable constant force mechanism 48. In the illustrated embodiment, wheel 80 is coupled to variable constant force mechanism 48, which is in turn coupled to support 90. Furthermore, support 90 can be pivotally coupled to pallet truck 100. In other embodiments illustrated in FIGS. 6-8B, a constant force mechanism 50 is shown. A secondary spring 68 (discussed below) can be included to provide the "variable" feature to produce the variable constant force mechanism 48.

The wheel 80 is illustrated as a caster-type wheel including a hub 82 about which a tire 84 is secured. In one form, the hub 82 is metallic (e.g., steel) and the tire 84, which may be non-metallic (e.g., plastic, such as, polyurethane), is molded over or secured to the hub 82. An axle 86 extends through from the wheel 80 to couple to a rigid arm 70, which is a component of the variable constant force mechanism 48. Snap rings, clips, or any other restraint may be used to capture the axle 86, as will be appreciated by one skilled in the art given the benefit of this disclosure.

While the axle 86 defines a circular cross-section in a plane perpendicular to the longitudinal axis of the axle 86, many other form factors are available, such as square, hexagonal, triangular, and the like. Furthermore, any number and/or type of wheels 80 may be supported by the axle 86; for instance, a pair of solid rubber wheels may be supported by the axle 86, or one or more plastic wheels may be incorporated.

Figure 9:
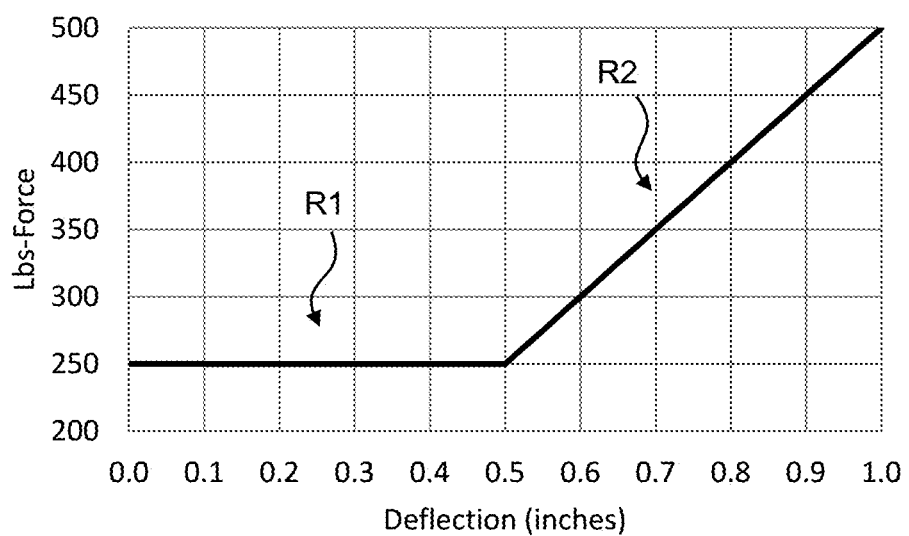
FIG. 9 is an example of a force profile for two operating regimes (R1, R2) of a caster with a variable constant force mechanism.

During operation of the pallet truck 100, the wheel assemblies 10 can be tuned to provide an appropriate nominal downward force throughout a first operating regime R1 (e.g., 250 lbs in FIG. 9). This downward force can be tunable based on desired vehicle performance characteristics. As the drive wheel 16 wears, the deflection across the wheel 80 will increase but the force applied to the wheel 80 remains fixed at the nominal level. In a second operating regime (R2 in FIG. 9) where the deflection across the wheel 80 exceeds a predetermined threshold value (e.g. 0.5 inches in FIG. 9), the force applied by the wheel assembly 10 can be increased to accommodate large deflection events such as turning. In a turning event, the deflection can exceed the predetermined value and the wheel assembly 10 can provide the appropriate roll stiffness. Whereas FIG. 9 illustrates a linear increase in force as deflection increases beyond the predetermined threshold, a non-linear force profile may also be used. In one aspect, operating regimes R1 and R2 and corresponding force profiles can vary and may be chosen based on realistic drive wheel 16 wear rates. Moreover, in some embodiments, only a single operating regime may be implemented, whereas in other embodiments, two, three or more operating regimes may be implemented.

The constant force operating regime can be variable and can be chosen based on realistic drive wheel 16 wear rates. Realizing the proposed wheel force profile would reduce the frequency of maintenance required to maintain optimal vehicle performance. One way to achieve the desired force profile can be to use a constant force mechanism. Many constant force mechanisms exist in the art and an example of such a mechanism is shown in U.S. Pat. No. 7,874,223, which is herein incorporated by reference in its entirety. This type of constant force mechanism can be incorporated into a wheel assembly 10 as shown in FIG. 5 to resist displacement of the wheel 80 in the wheel assembly 10. The illustrated variable constant force mechanism 48 includes a horizontal support 52 and a vertical support 54 which can be oriented perpendicular to each other. The horizontal support 52 is associated with a horizontal carriage 56 and a resistance device, such as a spring 64. Similarly, the vertical support 54 is associated with a vertical carriage 58 and a vertical spring 66. Furthermore, the rigid arm 70 can be pivotally coupled to the horizontal 56 and vertical 58 carriages at point 60 and point 62, respectively. In the illustrated embodiment, point 60 at one end of the rigid arm 70 is coupled to the horizontal carriage 56 and intermediate point 62 located between the rigid arm 70 ends is coupled to the vertical carriage 58. Horizontal spring 64 urges the horizontal carriage 56 horizontally along a horizontal axis defined by the horizontal support 52 and the vertical spring 66 urges the vertical carriage 58 downwardly along a vertical axis defined by the vertical support 54. Therefore, according to Hooke's law, a force due to the horizontal spring 64 acting on the horizontal carriage 56 can be approximated by equation 1:

$$F_H = k_H x_H \quad \text{(Eq. 1)}$$

where $F_H$ is the component of horizontal force acting on the horizontal carriage 56 due to the horizontal spring 64, $x_H$ is the horizontal displacement and $k_H$ is the spring rate constant of spring 64. Similarly, a force on the vertical carriage 58 due to the vertical spring 66 can be approximated by equation 2:

$$F_V = k_V x_V \quad \text{(Eq. 2)}$$

where $F_V$ is the component of vertical force acting on the vertical carriage 58 due to the vertical spring 66, $x_V$ is the vertical displacement and $k_V$ is the spring rate constant of spring 66. It can be determined, as previously demonstrated in U.S. Pat. No. 7,874,223, that for the geometry shown in U.S. Pat. No. 7,874,223, when $k_V$ and $k_H$ are equivalent and horizontal support 52 and vertical support 54 are orientated perpendicular to each other:

$$F_R = k_V L \quad \text{(Eq. 3)}$$

where $F_R$ is the resultant force at carriage 58, and L is the length of the arm between point 60 and point 62 in FIG. 5. As $k_V$ and L are constant, the force $F_R$ is therefore constant. When an extension is made to the rigid arm as is the case in the illustrated embodiment, the force at the wheel $F_W$ is $$F_W = k_V L^2/(L+S) \quad \text{(Eq. 4)}$$

where L is the length of the arm from point 60 to point 62 in FIG. 5 and S is the length of the arm from 62 to 86 in FIG. 5. Here again, because $k_V$, L and S are constant, the force $F_W$ is constant.

The result is that the downward force applied by the caster wheel remains constant throughout the stroke of the variable constant force mechanism 48. A secondary vertical spring 68 can be provided on the vertical support 54 coaxial with the vertical spring 66 that applies a greater downward force once the deflection exceeds the predefined constant force region to provide a preferred roll stiffness.

A constant force caster requires less maintenance or a reduced maintenance frequency. Tuning of the caster force profile allows the material handling vehicle equipped with the wheel configuration 10 to maintain optimal vehicle performance as the drive wheel 16 wears with reduced maintenance frequency.

Several alternative methods exist for constructing a wheel support 10 with a constant force mechanism. In lieu of the variable constant force mechanism detailed in FIG. 5, and the constant force mechanism shown in FIGS. 6-8B, a cam and follower could be used. The cam profile would be shaped to achieve the desired force profile. Likewise, a cam pulley could be used in the same fashion. Other mechanisms are available that create constant forces which are well known in the art.

Figure 10A:
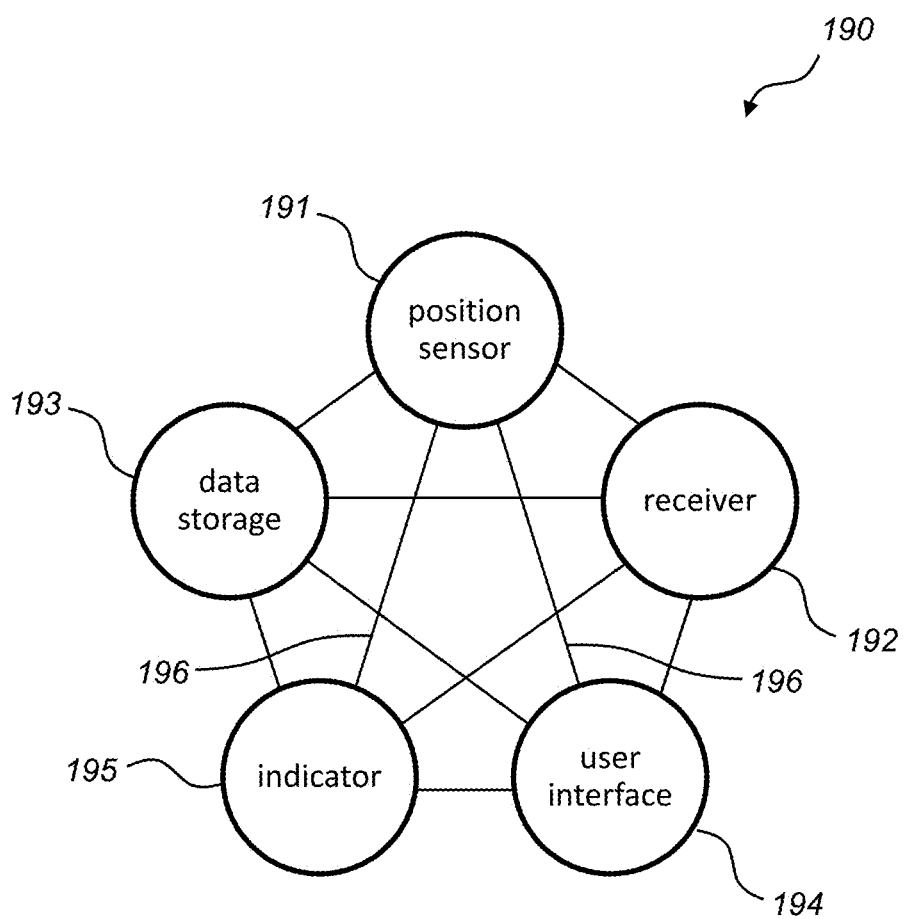
FIG. 10A is a schematic illustration of an embodiment of a position sensor system.

In addition to the wheel assembly, a material handling vehicle such as vehicle 100 can be equipped with a position sensor system 190. FIG. 10A shows a schematic illustration of one embodiment of a position sensor system 190 which can include one or more sensors 191, a receiver 192, data storage 193, user interface 194 and indicator 195. In one aspect, each of the components of the position sensor system 190 can be in communication with each of the other components of the position sensor system 190.

Figure 10B:
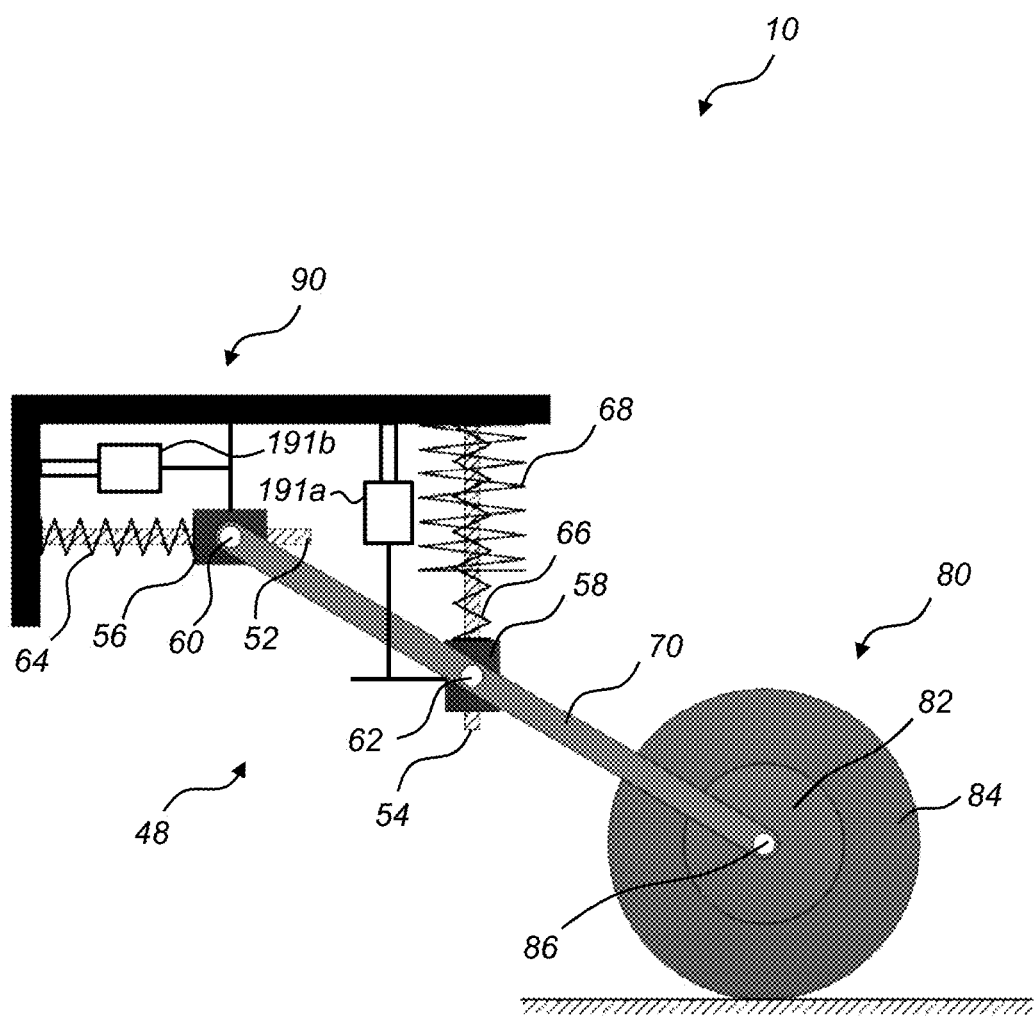
FIG. 10B is a schematic illustration of an embodiment of a caster with a variable constant force mechanism and including position sensors as part of a position sensor system.

With reference to FIG. 10B, the wheel assembly shown in FIG. 5 is illustrated showing possible locations of an exemplary position sensor 191. The position sensor 191 can measure a deflection across the caster and output a position or deflection value (see FIG. 11). The deflection provides an indication of the amount of wear (e.g., reduction in drive wheel 16 diameter) that has occurred. In one embodiment, the position sensor 191 can be a linear encoder and can be used to measure a deflection across the caster wheel (e.g., at a caster-arm pivot point). In some embodiments, the variable constant force mechanism 48 can perform best within a defined range of deflection. For example, when the measured deflection exceeds a predetermined threshold, a signal 196 can be generated by the position sensor system 190 to initiate a notice with an indicator 195 (e.g., warning message/indicator, email alert, etc.) advising personnel that the constant force caster wheel assembly measured deflection is exceeding the predetermined threshold. In one aspect, an indicator 195 can provide a notice through a user interface 194.

In some embodiments, the signal 196 can be communicated wirelessly via a bidirectional warehouse communication system with a computer system at a facility, such as a warehouse or a factory, where the vehicle operates. This enables data regarding the operating parameters to be sent to the computer system and enables the pallet truck 100 to receive data and commands from the computer system. Additionally, the warehouse communication system can be connectable through a network, such as the Intranet, to remote computers, such as at the headquarters of the company that operates the facility and at the manufacturer of the vehicle.

FIG. 10B illustrates two linear position sensors 191a and 191b. Vertical position sensor 191a can detect a vertical displacement of the vertical carriage 58, and horizontal position sensor 191b can detect a horizontal displacement of the horizontal carriage 56. In some embodiments, horizontal position sensor 191b (or vertical position sensor 191a) can serve as a back-up to vertical position sensor 191b (or horizontal position sensor 191b) to provide a redundant position sensor system. Moreover, although two linear position sensors are shown, it is to be understood that a single position sensor 191 may be included in the design of the wheel assembly 10 without departing from the scope of the invention. If a single position sensor 191 is provided, the single position sensor 191 can measure the displacement of either one of the carriages 56, 58. In still other embodiments, a single position sensor can be arranged to monitor both carriages 56, 58 simultaneously.

Figure 11:
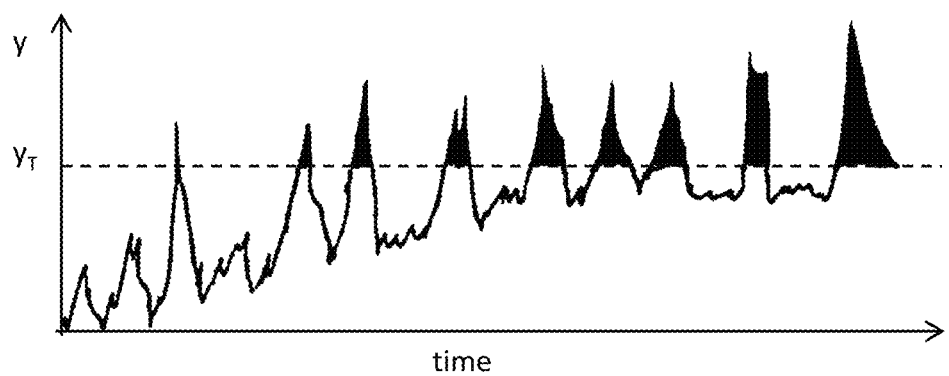
FIG. 11 is an example of a drive wheel wear profile showing drive wheel wear over time as monitored by a position sensor system.

Referring to FIG. 11, a plot of an example of a drive wheel wear profile is shown. The drive wheel wear as a function of time is monitored by way of the position sensor, such as sensor 191. In the case of a vertical position sensor, the displacement of the vertical carriage 54 can be plotted as a function of time, where y represents that displacement and $y_T$ represents a threshold value. In FIG. 11, an upward displacement (resulting in a compression of the vertical spring) results in an increase of the value of y, whereas a downward displacement (resulting in an extension of the spring) results in a decrease of the value of y. The threshold value $y_T$ may be predetermined (e.g., a factory setting) or set by a user.

Figure 12:
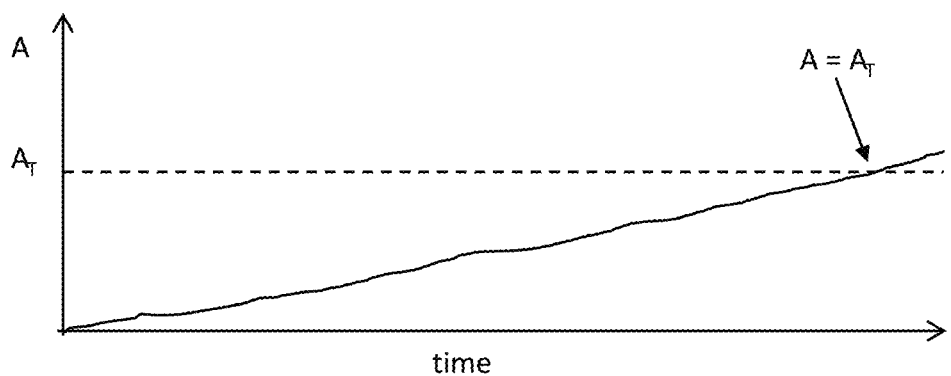
FIG. 12 is a plot showing an integration of the wear profile illustrated in FIG. 11 for values of $y > y_T$.

FIG. 12 shows a plot of an integration of the wear profile illustrated in FIG. 11 for values of y>$y_T$. In other words, the cumulative area (A) under the curve of the wear profile in FIG. 11 (shaded regions) can be monitored for displacements greater than the threshold displacement value. When the value of A equals or exceeds a threshold value $A_T$, a signal can be generated. The arrow in FIG. 12 indicates the point on the plot at which A=$A_T$. In a manner similar to the selection of $y_T$, $A_T$ may also be predetermined (e.g., a factory setting) or set by a user. The signal generated can indicate that the drive wheel may need to be repaired or replaced. Details regarding the signal are described below.

Figure 13:
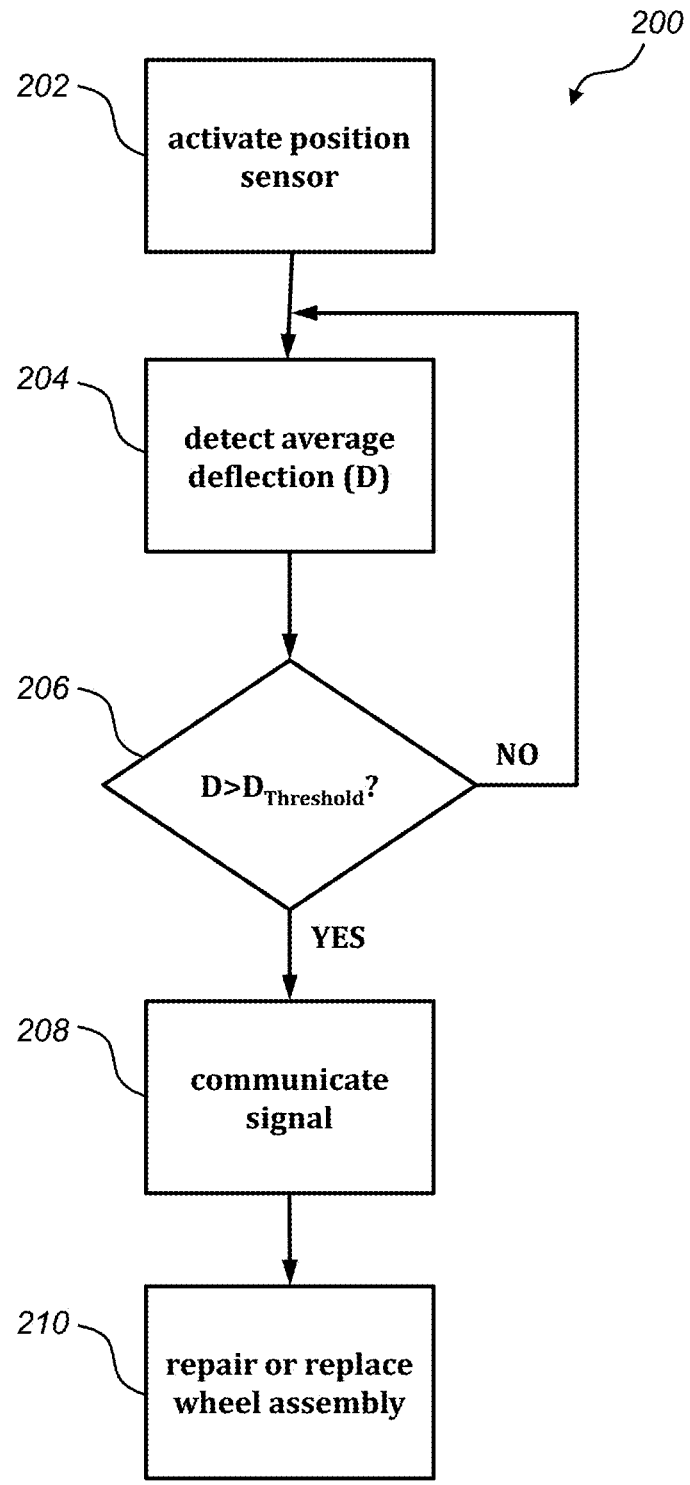
FIG. 13 is an illustration of a method for operating a position sensor system to send an indication signal.

Referring to FIG. 13, an embodiment of a process incorporating a position sensor system 190 is illustrated as a method 200. In step 202 of the method 200, the position sensor system 190 and the position sensor 191 can be activated. Activation of the position sensor system 190 can occur when the vehicle is powered on or can occur intermittently while the vehicle is in operation. In addition, the position sensor system 190 can be activated manually or automatically. For example, a user can choose to activate the position sensor system 190 to periodically determine whether a wheel assembly requires maintenance. In some embodiments, the position sensor system 190 can be reset, for example, following a maintenance procedure. Alternatively, the position sensor system 190 can be continuously active regardless of the status of the vehicle.

In a second step 204 of the method 200, the position sensor 191 can detect a property of a wheel assembly such as wheel assembly 10. The position sensor 191 can be configured to detect the deflection or average deflection of the wheel. In the case where the average deflection is detected, an average deflection value (D) can be recorded. In one example, deflection data can be transmitted from the position sensor 191 to a receiver 192 that can record the deflection data in data storage 193. In certain embodiments, D can be equivalent to y or A as seen in FIGS. 11-12. In a next step 206 of the method 200, D can be compared with a predetermined threshold value ($D_{Threshold}$). In certain embodiments, $D_{Threshold}$ can be equivalent to $y_T$ or $A_T$ as seen in FIGS. 11-12. $D_{Threshold}$ can be chosen to indicate when a signal could be communicated to a user. For example, a user can be notified with an indicator 195 to indicate when the wheel assembly requires maintenance, which can include repairing or replacing the wheel. Based on the degree of wheel wear, $D_{Threshold}$ may be selected to be a value that can be indicative of a level of wheel wear at which maintenance could be considered. Therefore, in a step 206, if D is greater than $D_{Threshold}$, than in a next step 208 of the method 200, a signal can be communicated to a user. However, if D is less than or equal to $D_{Threshold}$, then the method 200 can return to step 204.

In the case where D exceeds $D_{Threshold}$, a user can be notified by the position sensor system 190. The notification can include a signal 196 sent by a wired or wireless communication method to a device such as a computer, cell phone, tablet or other such device or user interface 194. The notification can also include an audible or visual notification such as an intermittent or constant audible tone or light display provided by an indicator 195. When the notification is received by the user, in a step 210, the user may choose to repair or replace the wheel assembly based on the signal communicated by the position sensor system 190.

Figure 14:
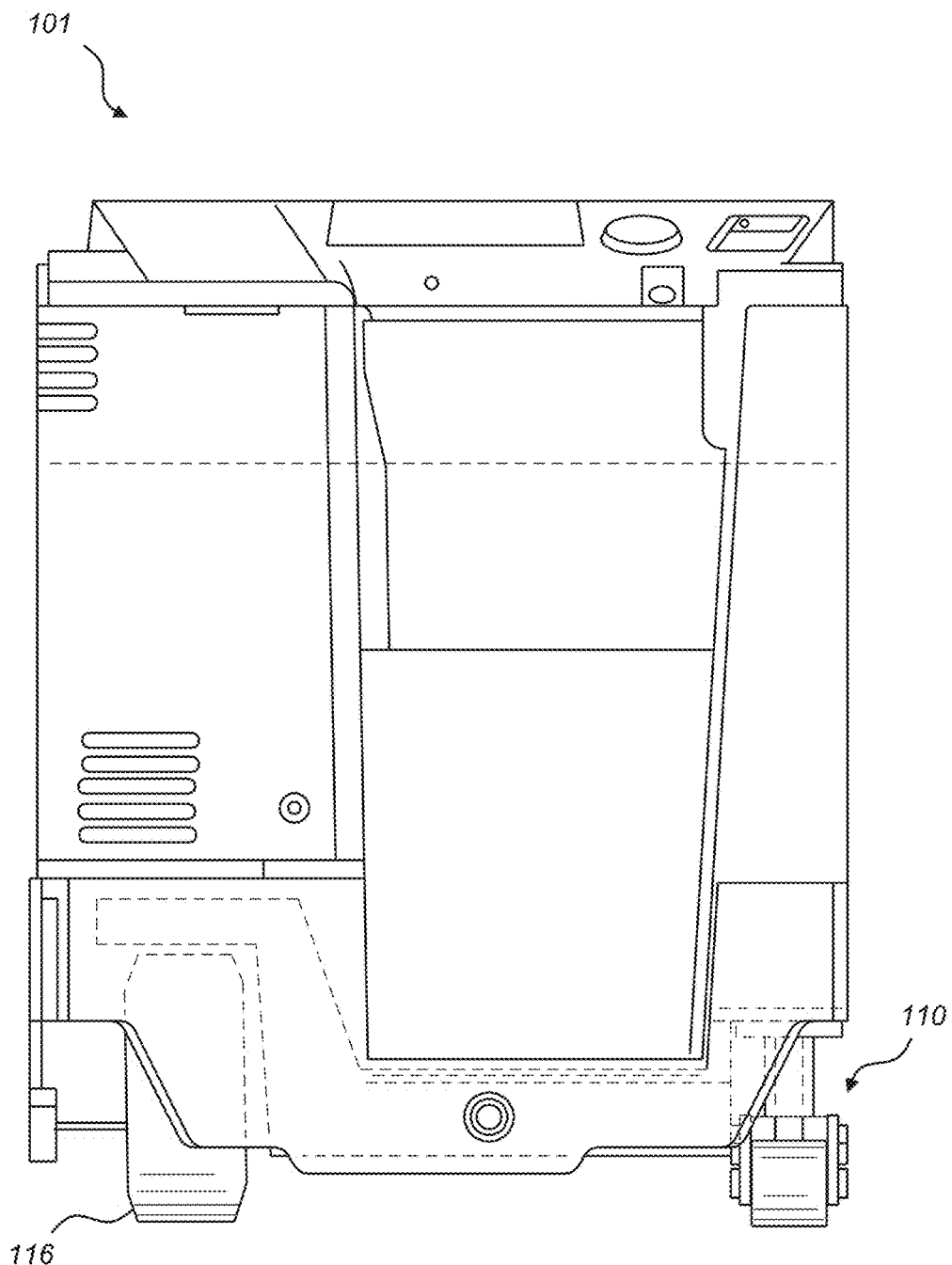
FIG. 14 is a rear view of a material handling vehicle equipped with a caster wheel assembly including a variable constant force mechanism.
Figure 15:
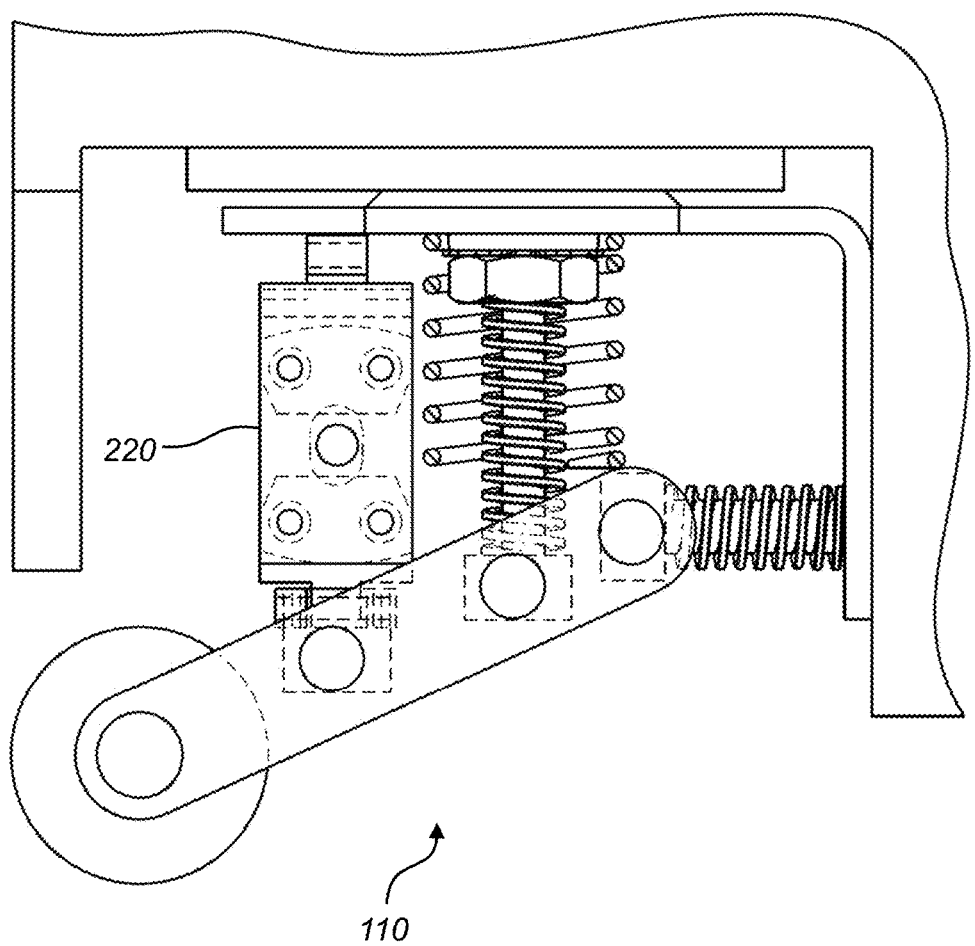
FIG. 15 is an enlarged partial side view of the material handling vehicle of FIG. 14 showing the caster wheel assembly including the variable constant force mechanism and an inertial damper.
Figure 16:
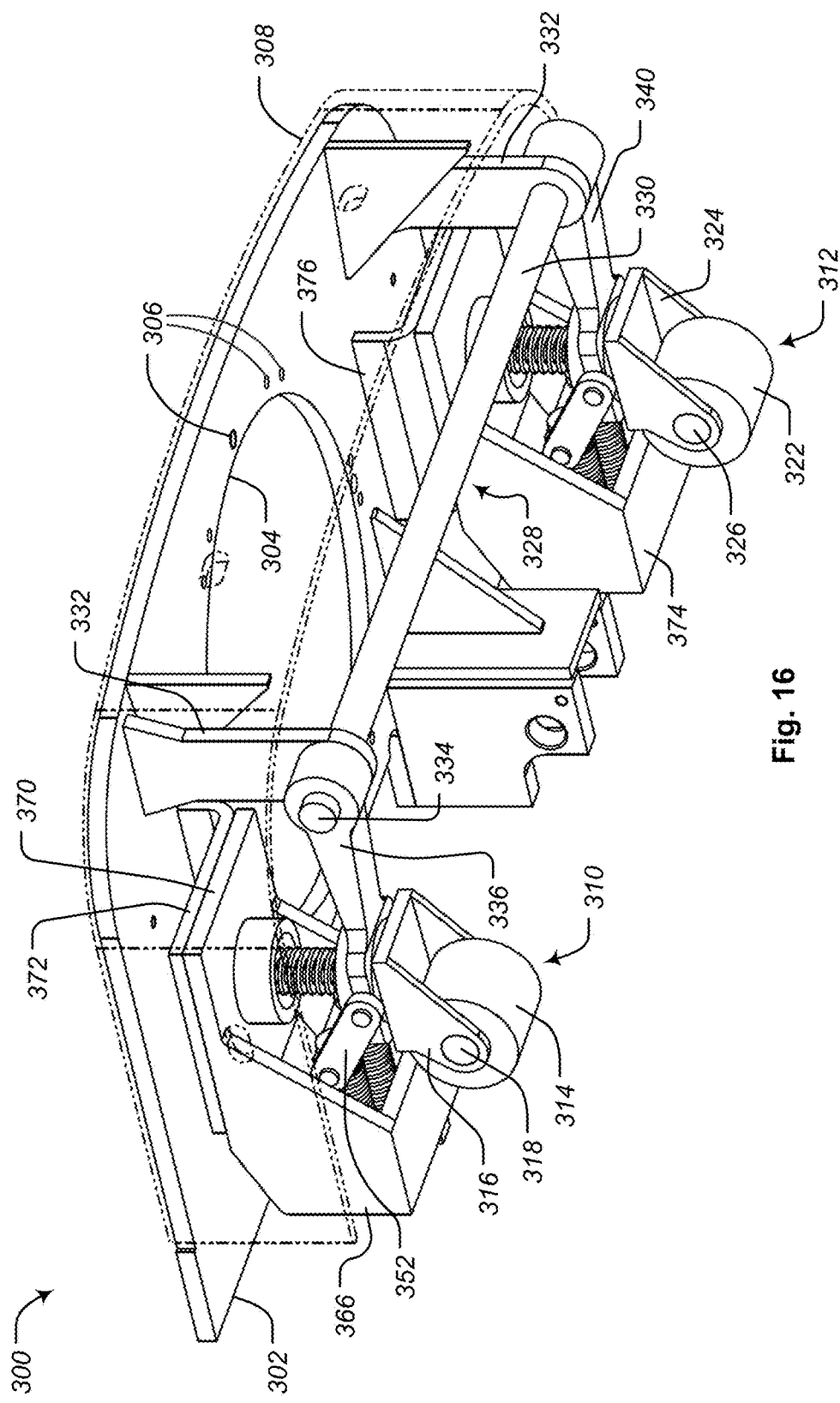
FIG. 16 is a perspective view of an embodiment of a chassis of a material handling vehicle including a pair of constant force caster wheels coupled with a torsion bar.

In a further embodiment, a single caster wheel assembly including a constant force mechanism may be used on a material handling vehicle. As a non-limiting example, a caster wheel assembly including a constant force mechanism 50 or variable constant force mechanism 48 may be used on a reach truck. In general, a known reach truck may include a caster wheel and inertial damper assembly with coil springs and an inertial damper to dissipate energy. One embodiment of a reach truck 101 according to the present technology can include a single wheel assembly 110, as shown in FIGS. 14 and 15. The coil springs associated with a known caster wheel may be replaced with a constant force mechanism 50, or variable constant force mechanism 48 to provide wheel assembly 110. In one aspect, the wheel assembly 110 may exert a constant force on a ground surface as the drive wheel 116 wears. In another aspect, wheel assembly 110 may function similarly to wheel assembly 10 as shown, for example, in FIG. 5. It will be appreciated that embodiments of a reach truck 101 or other material handling vehicles may include only one wheel assembly 110 with a constant force mechanism. However, embodiments of a reach truck 101 or other material handling vehicles may also include two or more wheel assemblies 110. In some embodiments, the wheel assembly 110 can also include an inertial damper 220 to help dissipate energy.

Other constant force mechanisms in addition to those described herein and other mechanisms in general may also be used. For example, as an alternative (or in addition) to a caster wheel assembly including a constant force mechanism, a cam and follower may be used. A cam profile may be shaped to achieve a desired force profile. In another aspect, a cam pulley may be used in addition to or in place of a cam and follower.

In another embodiment, the present disclosure provides a wheel assembly, and more particularly, a constant force caster wheel assembly with a torsion bar that may be incorporated into a material handling vehicle such as a pallet truck, fork truck, or the like. The wheel assembly may include a pair of caster wheels coupled by a torsion bar such that a displacement of one of the caster wheels may transmit a torque through the torsion bar to the other caster wheel. In the case of a material handling vehicle including a central drive wheel, the caster wheels may be positioned adjacent to or flanking the drive wheel such that the drive wheel is intermediate the caster wheels. The wheel assembly may further include at least one constant force mechanism positioned to resist a displacement of the caster wheels or the torsion bar in order that the caster wheels may exert a combined constant force on a surface of travel such as the ground. In one aspect, a constant force caster wheel assembly with torsion bar may reduce the frequency at which a caster wheel is adjusted in response to wear of the tire of a drive wheel, the caster wheel, or another component of a material handling vehicle. In another aspect, the inclusion of a torsion bar may provide a kinematic link between caster wheels. Accordingly, the torsion bar may improve the handling or maneuverability of a material handling vehicle such as when the vehicle is turning or cornering. Moreover, the properties of the torsion bar may be adjusted to vary the response of the vehicle when the torsion bar is engaged by a deflection of one or more of the caster wheels.

Referring to FIGS. 16-19, a constant force caster wheel assembly with torsion bar (wheel assembly 300) can include a mounting platform or chassis 302. In one aspect, the chassis 302 may be coupled to a base of a material handling vehicle (see, for example, FIGS. 1-4, 14). As such, chassis 302 may include a circular opening 304 configured to accommodate a centrally positioned drive wheel 16 (see FIG. 4). Chassis 302 may also include additional features such as holes 306 for mounting the chassis to another component with screws, bolts or other like fasteners. Furthermore, the chassis 302 may be surrounded by an apron 308 (shown in broken lines for clarity) to conceal the components positioned beneath the chassis 302. In some embodiments, the chassis may include additional structural elements in order to provide a framework for mounting a constant force caster wheel assembly with torsion bar to a material handling vehicle. However, it may be possible to omit chassis 302 altogether in embodiments in which the caster wheels, constant force mechanisms, and torsion bar are coupled directly to a material handling vehicle. It should be noted that words of orientation or direction such as "beneath", "above", "left", "right" and so forth may be relative and are used by way of illustration of an embodiment of a wheel assembly according to the present disclosure. Therefore, such terms should not be construed as limiting.

Figure 17:
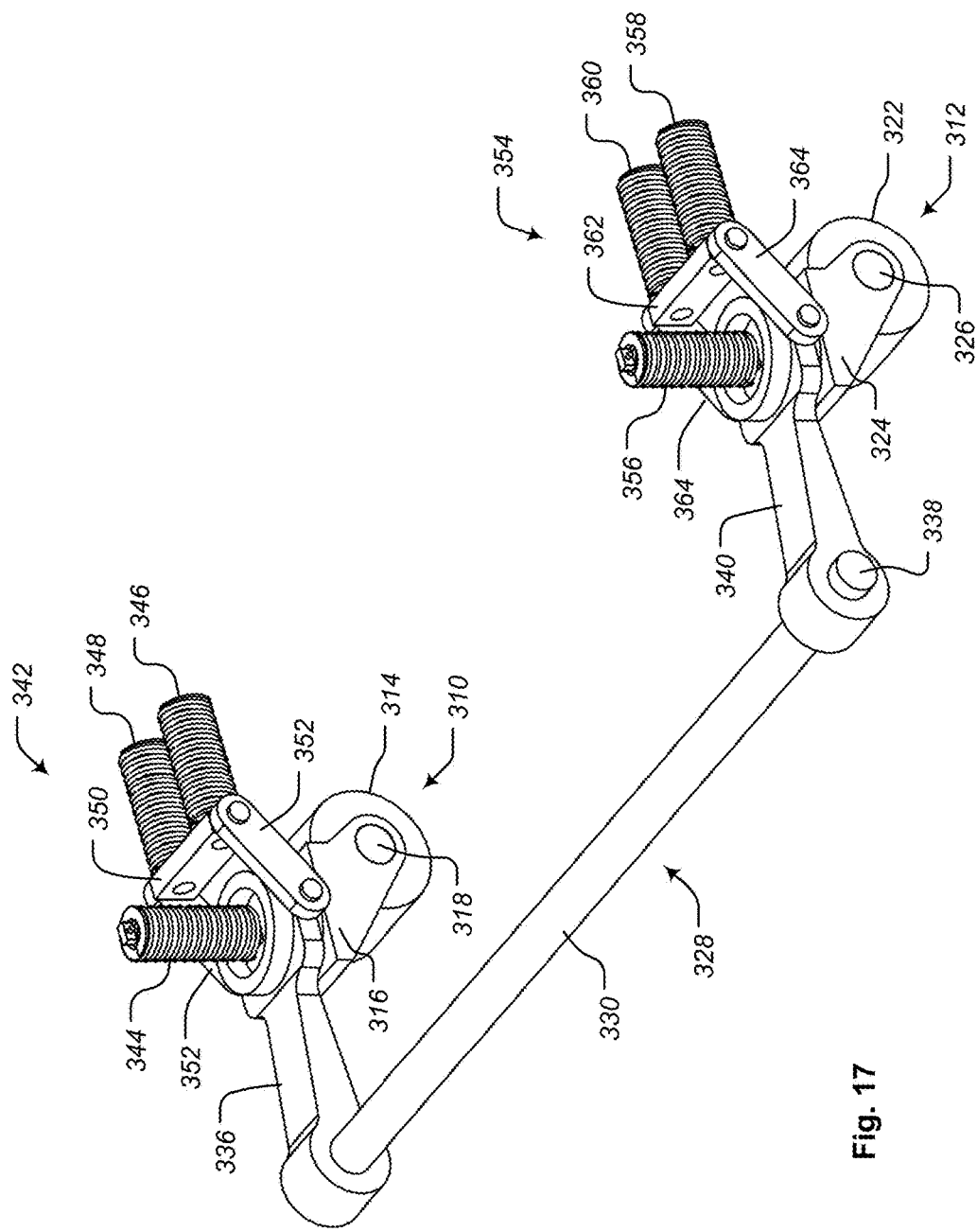
FIG. 17 is a perspective view of the constant force caster wheels and torsion bar of FIG. 16 in isolation.
Figure 18:
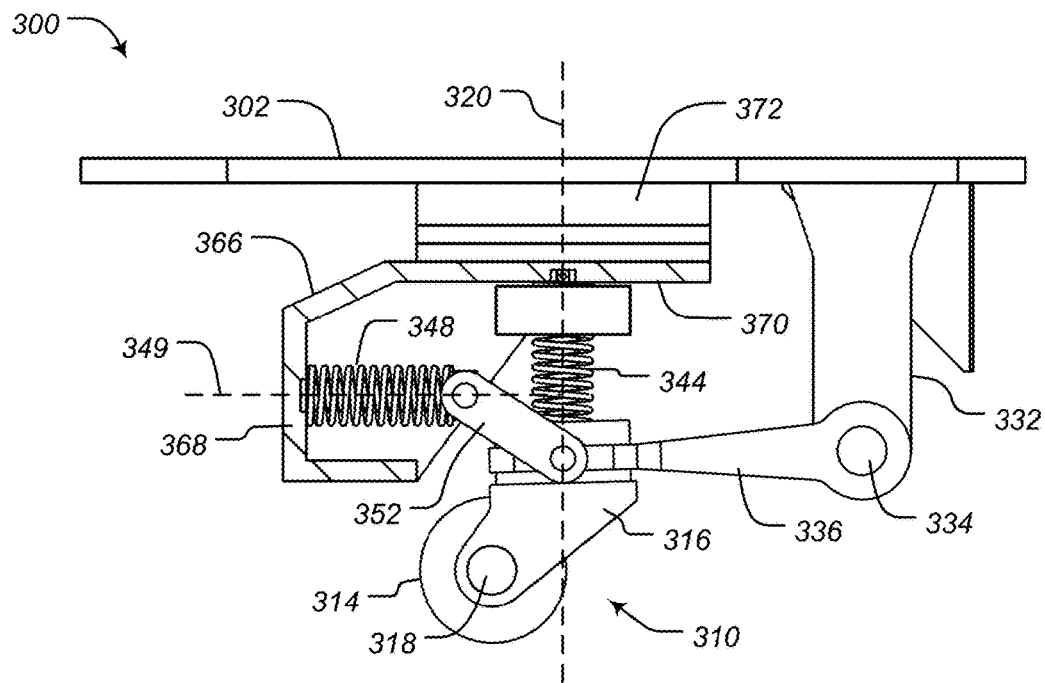
FIG. 18 is a side elevational view of the chassis of FIG. 17 with the caster housing partially broken away for clarity.
Figure 19:
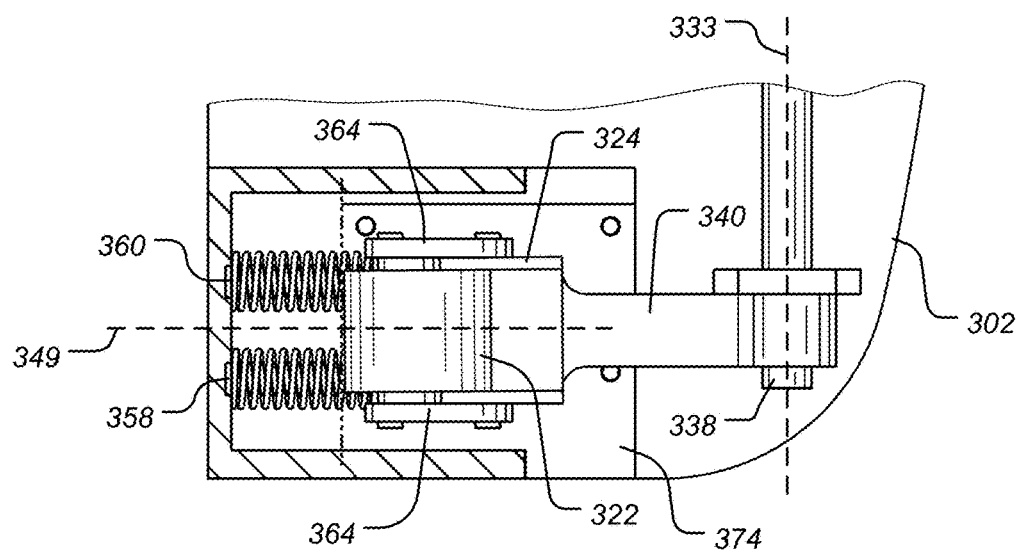
FIG. 19 is a partial cross-sectional bottom plan view of the chassis of FIG. 17 with the caster housing partially broken away for clarity.

With continued reference to FIGS. 16-19, wheel assembly 300 can further include a right caster wheel 310 and a left caster wheel 312. The right caster wheel 310 includes a wheel 314 coupled to a yoke 316 by axle 318. The yoke 316 may be capable of swiveling or rotating about an upright axis 320 as shown in FIG. 18. Similarly, left caster wheel 312 includes a wheel 322 coupled to a yoke 324 by axle 326. Yoke 324 may also be capable of swiveling about an upright axis 320 as in the case of yoke 316. A torsion bar 328 couples the right caster wheel 310 to the left caster wheel 312. The torsion bar 328 can include an elongated cylindrical member 330 that is pivotally supported by a pair of spaced apart arms 332 that extend vertically downwards from beneath the chassis 302. Accordingly, the cylindrical member may be curved or straight, and may pivot, twist or otherwise exert a moment about a longitudinal axis 333 of the torsion bar (FIG. 19). In some embodiments, the torsion bar 328 may be pivotally attached to the chassis of the vehicle using bearings or bushings. In other embodiments, the torsion bar 328 may include a non-cylindrical member. For example, the member may have an alternative cross-sectional profile, such as a square, rectangular, triangular, or other polygonal profile. Moreover, the cross-sectional profile of the torsion bar may vary along its length. In yet other embodiments, the cylindrical member 330 may be replaced or augmented with another torque transmitting member. Suitably, any device or apparatus that provides a kinematic link between a pair of caster wheels may be used.

In one aspect, the torsion bar 328 may provide a kinematic link between the right caster wheel 310 and left caster wheel 312. A first end 334 of the cylindrical member 330 can couple to a first mounting arm 336, which is in turn can be coupled to the right yoke 316. An opposing second end 338 (FIG. 17) of the of the cylindrical member 330 can be coupled to a second mounting arm 340, which in turn can be coupled to the left yoke 324. The first mounting arm 336 can further couple the right caster wheel 310 to a constant force mechanism 342. The constant force mechanism 342 can include a first resistance member 344 oriented along upright axis 320 to resist a vertical displacement of the right caster wheel 310 along axis 320. The constant force mechanism 342 can further include a second resistance member 346 and in some embodiments, an adjacent third resistance member 348 oriented along a second axis 349 (FIGS. 18 and 19) perpendicular to axis 320 in order to resist a horizontal displacement.

In one aspect, resistance members 344, 346 and 348 may be conventional coil springs, elastomer springs, or any other resistance means or combination thereof. In addition, while constant force mechanism 342 is shown with two horizontal resistance members (346, 348), other embodiments may suitably include a single horizontal resistance member or any other number of resistance members. The second resistance member 346 and third resistance member 348 can be mounted at one end to a member 350 that can be coupled to mounting arm 336 by links 352. Accordingly, a displacement of the first resistance member 344 may result in a displacement of the second resistance member 346 and third resistance member 348. Generally, the constant force mechanism 342 may behave similarly to constant force mechanism 50 as described for wheel assembly 10 in the embodiments shown in FIGS. 1-15.

The second mounting arm 340 may similarly couple the left caster wheel 312 to a constant force mechanism 354 (FIG. 17). Constant force mechanism 354 may have a similar structure and function to constant force mechanism 342 including a vertical first resistance member 356, a horizontal second resistance member 358 and in some embodiments, a third resistance member 360, and a member 362 coupled to mounting arm 340 by links 364. In one aspect, torsion bar 328 may provide a kinematic link between constant force mechanism 342 and constant force mechanism 354. For example, a vertical displacement or deflection of the right caster wheel 310 may be resisted by both constant force mechanism 342 and constant force mechanism 354 as a result of the link provided by torsion bar 328. Accordingly, in some embodiments, the total combined output force of constant force mechanism 342 and constant force mechanism 354 may be set to a predetermined constant force value allowing the individual forces on the individual caster wheels (i.e., right caster wheel 310 and left caster wheel 312) to independently vary.

With continued reference to FIGS. 16-19, the constant force mechanism 342 may be partially enclosed in a housing 366. In one aspect, the second resistance member 346 and third resistance member 348 are coupled to a rear wall 368 of the housing 366 (FIG. 18). In another aspect, the first resistance member 344 may be mounted to an upper wall 370 of the housing 366. The upper wall 370 of the housing 366 may be coupled to the underside of the chassis 302 by an L-shaped mounting plate 372. Analogous to the right side constant force mechanism 342, left side constant force mechanism 354 may be mounted within a partial housing 374, which in turn can be coupled to the underside of chassis 302 with an L-shaped bracket 376.

In operation, the wheel assembly 300, and more particularly, constant force mechanisms 342 and 354 may be used to provide a constant restoring force on right caster wheel 310 and left caster wheel 312. As shown in the example in FIG. 20, a total constant force mechanism may be tuned to exert a constant force of about 2.2 kN (about 500 $lb_f$) depending on the vehicle application. Therefore, during certain steady state modes of operation of the wheel assembly (e.g., travel in straight line) the force may be evenly distributed with about 1.1 kN (about 250 $lb_f$) on each of the right caster wheel 310 and left caster wheel 312. By comparison, during other modes of operation of the wheel assembly (e.g., a turning maneuver), the greater portion of the force may be shifted onto one of the caster wheels such that the individual forces on each of the caster wheels is not equal. However, the total combined force on each of the caster wheels may remain constant regardless of the mode of operation or the extent of the deflection across the caster wheels. By contrast, a conventional sprung caster may generally obey Hooke's law. For example, an increasing deflection applied to a sprung caster may result in a proportionally increasing amount of applied force.

Figure 20:
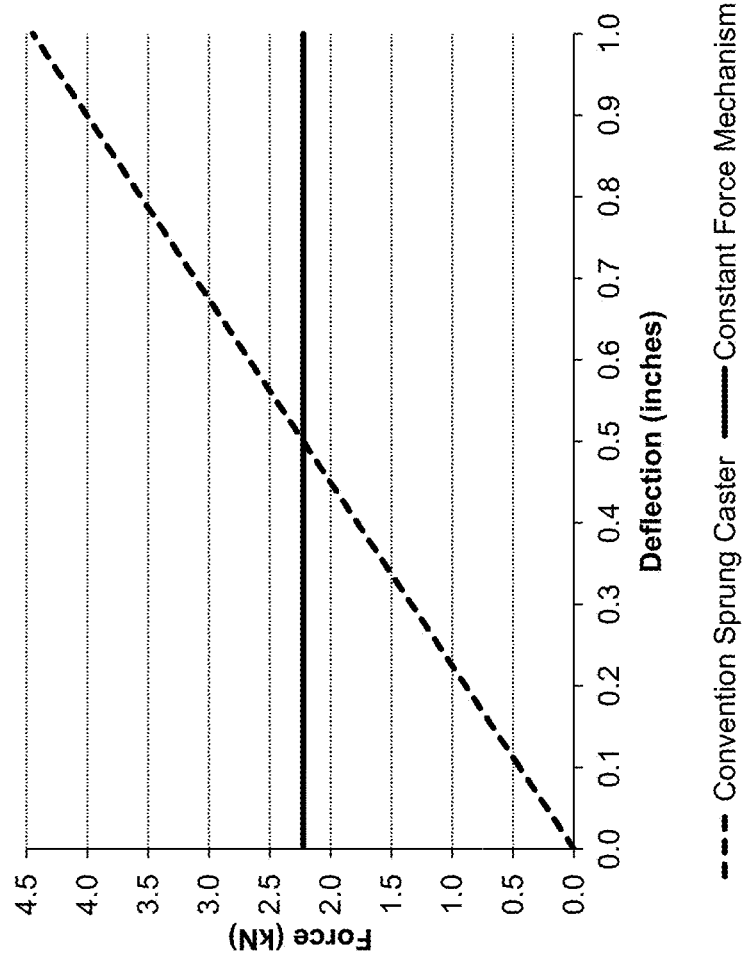
FIG. 20 is a plot of a force profile as a function of caster wheel deflection for a conventional sprung caster and a constant force caster according to the present disclosure.

With continued reference to FIG. 20, it may be noted that even for small deflections, the wheel assembly 300 may generate a substantial force (i.e., about 2.2 kN or about 500 $lb_f$). Accordingly, a material handling vehicle equipped with the wheel assembly 300 may have the advantage of providing improved roll resistance when compared to a conventional sprung caster as the vehicle travels around a curve. In contrast a conventional sprung caster may generate a force proportional to the deflection across the caster wheel. As shown in FIG. 20, for a deflection of less than about 1.3 cm (about 0.5 inches), the restoring force may be small compared to the wheel assembly 300. Furthermore, as the tire of the drive wheel wears, the deflection across the caster wheels may increase causing the conventional sprung caster to bear more and more of the load while the force borne by the wheel assembly 300 remains fixed. As a result, the conventional caster may need more frequent adjustment than wheel assembly 300.

Figure 21:
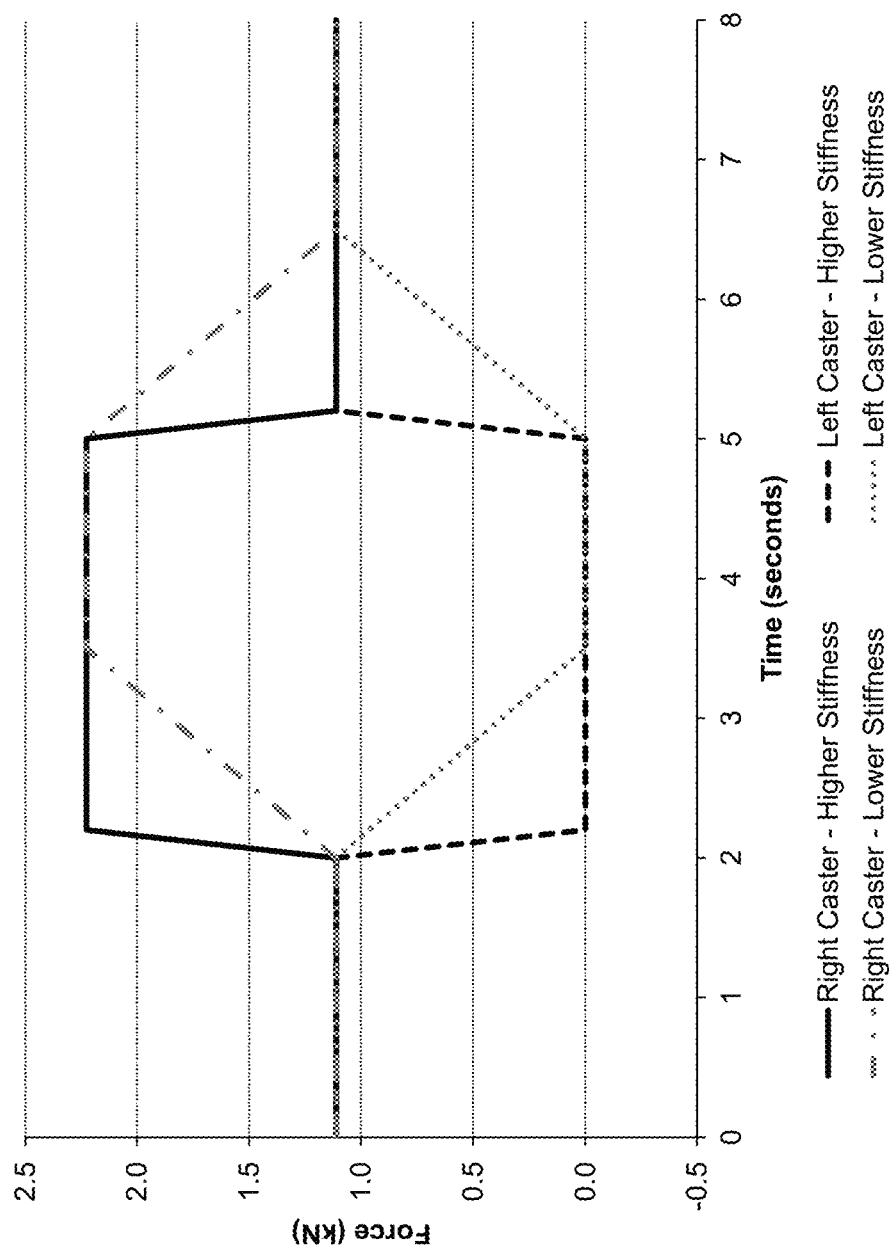
FIG. 21 is a plot of a time-dependent force profile for an embodiment of a material handling vehicle equipped with a pair of constant force caster wheels coupled with a torsion bar according to the present disclosure. The plot shows the behavior of both a higher stiffness and lower stiffness torsion bar before, during and after a left hand turn maneuver.

In other embodiments of a wheel assembly such as wheel assembly 300, a torsion bar may couple a right caster wheel and left caster wheel in order that a deflection of one of the caster wheels may be linked to a deflection of the other caster wheel. For example, if the left caster experiences a deflection, the torsion bar may serve as a kinematic link to deflect the right caster wheel as well. FIG. 21 shows a caster-torsion bar system with constant force mechanisms associated with each wheel assembly 300. In one aspect, the flexibility of the torsion bar may be a design variable that allows for the system to be tuned for improved subjective feel. If the torsion bar is selected to have a higher stiffness, then the transitions between turns may be more readily perceived by an operator of the material handling vehicle. In order to reduce an abrupt transition during a turning maneuver, it may be useful to provide a torsion bar that is more flexible or has a lower stiffness.

As shown in FIG. 21, a force profile for a higher stiffness torsion bar may differ from a force profile for a lower stiffness torsion bar for a vehicle performing a left turn maneuver. As the turning maneuver begins (time=2 seconds), the vehicle rolls to the right and the load is transferred to the right caster wheel. The rate at which this load transfers may be governed by the stiffness of the torsion bar. When the vehicle exits the corner (time=5 seconds) a portion of the load may be reapplied to the left caster. If this reapplication of the load happens abruptly it may be noticeable to an operator of the vehicle. A torsion bar with a lower stiffness would smooth the turning transition. In particular, the example in FIG. 21 illustrates that a torsion bar with a higher stiffness may result in a steep (larger) slope for a time dependent force profile, whereas a lower stiffness torsion bar may result in a more shallow (smaller) slope.

It should be noted, that in embodiments in which a pair of caster wheels are coupled by a torsion bar, a single constant force mechanism (or more than two constant force mechanisms) may be used. For example, in some embodiments, it may be useful to provide a single constant force mechanism coupled to only one of the pair of caster wheels such as the right caster wheel. In other embodiments, it may be useful to provide a single constant force mechanism coupled directly to the torsion bar. In one aspect, in embodiments where a pair of caster wheels is coupled by a torsion bar, the behavior of the wheel assembly may be the same for both a single constant force mechanism arrangement and an arrangement having a pair of constant force mechanisms, as in wheel assembly 300. In another aspect, the use of two constant force mechanisms may allow for the use of smaller springs with a smaller spring constant. For example, the use of smaller springs may have a benefit for the design and implementation of a wheel assembly. Moreover, alternative (or additional) methods may be used to provide a constant force mechanism as would be known to one of ordinary skill.

In some embodiments, as in the case of wheel assembly 10 in FIGS. 1-15, a wheel assembly such as wheel assembly 300 may include a sensor for measuring a property associated with the wheel. For example, one or more sensors may measure an instantaneous or average deflection of one or both of the caster wheels. In one aspect, sensors may be in communication with a sensor system that generates a signal when the measured deflection of the wheel exceeds a predetermined threshold. In another aspect, the signal may communicate a status of the wheel such as an indication that the wheel may require maintenance.

While there has been shown and described what is at present considered the preferred embodiments of the invention, it will be appreciated by those skilled in the art that, given the benefit of this disclosure, various changes and modifications can be made without departing from the scope of the invention defined by the following claims.

We claim:

1. A wheel assembly for a material handling vehicle, comprising:
   a chassis;
   a first caster wheel mounted to the chassis;
   a second caster wheel mounted to the chassis;
   a torsion bar coupling the first caster wheel to the second caster wheel;
   a constant force mechanism coupled to at least one of the first caster wheel, the second caster wheel and the torsion bar;
   the first caster wheel and the second caster wheel being displaceable in at least one dimension;
   the constant force mechanism imparts a substantially constant force opposing a displacement of the first caster wheel and the second caster wheel in the at least one dimension; and
   wherein the constant force mechanism includes a first resistance member oriented to resist a displacement along a first axis, and a second resistance member oriented to resist a displacement along a second axis perpendicular to the first axis.

2. The wheel assembly of claim 1, wherein the torsion bar transfers a torque between the first caster wheel and the second caster wheel for a displacement of the constant force mechanism in the at least one dimension.

3. The wheel assembly of claim 1, wherein the torsion bar is pivotally connected to the chassis, a pivot axis of the torsion bar coinciding with a longitudinal axis of the torsion bar.

4. The wheel assembly of claim 1, further comprising a second constant force mechanism coupled to at least one of the first caster wheel, the second caster wheel and the torsion bar.

5. The wheel assembly of claim 1, further comprising a drive wheel positioned intermediate the first caster wheel and the second caster wheel.

6. The wheel assembly of claim 1, wherein the constant force mechanism further includes a third resistance member oriented to resist a displacement along one of the first axis and the second axis.

7. The wheel assembly of claim 1, further comprising a sensor for measuring a property associated with one of the first caster wheel or the second caster wheel.

8. The wheel assembly of claim 7, wherein the sensor measures deflection of one of the first caster wheel and the second caster wheel, the sensor being in communication with a sensor system, and the sensor system generates a signal when the measured deflection of one of the first caster wheel and the second caster wheel exceeds a predetermined threshold.

9. The wheel assembly of claim 8, wherein the signal communicates a status of one of the first caster wheel and the second caster wheel.

10. The wheel assembly of claim 8, wherein the sensor system is configured to determine an average deflection across one of the first caster wheel and the second caster wheel.

11. The wheel assembly of claim 8, wherein the signal indicates that one of the first caster wheel and the second caster wheel may require maintenance.

12. The wheel assembly of claim 1, wherein the chassis is coupled to the material handling vehicle.

13. A wheel assembly for a material handling vehicle, comprising:
   a chassis;
   a first caster wheel mounted to the chassis, the first caster wheel including a first constant force mechanism;
   a second caster wheel mounted to the chassis, the second caster wheel including a second constant force mechanism;
   a torsion bar coupling the first caster wheel to the second caster wheel;
   the first caster wheel and the second caster wheel being displaceable in at least one dimension;
   the first constant force mechanism imparts a substantially constant force on the first caster wheel in the at least one dimension;
   the second constant force mechanism imparts a substantially constant force on the second caster wheel in the at least one dimension; and
   wherein at least one of the first and second constant force mechanisms includes a first resistance member oriented to resist a displacement along a first axis, and a second resistance member oriented to resist a displacement along a second axis perpendicular to the first axis.

14. The wheel assembly of claim 13, wherein the torsion bar transfers a torque between the first caster wheel and the second caster wheel for a displacement of at least one of the first constant force mechanism and the second constant force mechanism in the at least one dimension.

15. The wheel assembly of claim 13, wherein the torsion bar is pivotally connected to the chassis, a pivot axis of the torsion bar coinciding with a longitudinal axis of the torsion bar.

16. The wheel assembly of claim 13, further comprising a drive wheel positioned intermediate the first caster wheel and the second caster wheel.

17. The wheel assembly of claim 13, wherein one of the first constant force mechanism and the second constant force mechanism further includes a third resistance member oriented to resist a displacement along one of the first axis and the second axis.

18. A material handling vehicle comprising:
   a vehicle chassis;
   a fork carriage coupled to the vehicle chassis;
   at least one lifting fork coupled to the fork carriage and displaceable in at least a first dimension;
   a first caster wheel mounted to the chassis;
   a second caster wheel mounted to the chassis;
   a drive wheel coupled to the vehicle chassis and positioned intermediate the first and second caster wheels;
   a torsion bar coupling the first caster wheel to the second caster wheel;
   a constant force mechanism coupled to at least one of the first caster wheel, the second caster wheel and the torsion bar;
   the first caster wheel and the second caster wheel being displaceable in at least one dimension;
   the constant force mechanism including a first resistance member oriented to resist a displacement along a first axis, and a second resistance member oriented to resist a displacement along a second axis perpendicular to the first axis; and
   the torsion bar transfers a torque between the first caster wheel and the second caster wheel for a displacement of constant force mechanism.

19. The material handling vehicle of claim 18, wherein the torsion bar transfers a torque between the first caster wheel and the second caster wheel for a displacement of the constant force mechanism in the at least one dimension.

20. The material handling vehicle of claim 18, further comprising a second constant force mechanism coupled to at least one of the first caster wheel, the second caster wheel and the torsion bar.

\* \* \* \* \*

UNITED STATES PATENT AND TRADEMARK OFFICE
CERTIFICATE OF CORRECTION

PATENT NO.       : 9,593,003 B2
APPLICATION NO.  : 14/267267
DATED            : March 14, 2017
INVENTOR(S)      : Fernando D. Goncalves et al.

It is certified that error appears in the above-identified patent and that said Letters Patent is hereby corrected as shown below:

In the Claims

Column 16, Claim 18, Line 63, "of constant" should be --of the constant--.

Signed and Sealed this
Twenty-third Day of May, 2017

Michelle K. Lee
*Director of the United States Patent and Trademark Office*